US012768312B2

(12) United States Patent
Whitney

(10) Patent No.: US 12,768,312 B2
(45) Date of Patent: Oct. 20, 2026

(54) HORIZON BASED ENGINE CONTROL

(71) Applicant: SAUDI ARABIAN OIL COMPANY, Dhahran (SA)

(72) Inventor: Christopher Whitney, Commerce, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 166 days.

(21) Appl. No.: 18/758,488

(22) Filed: Jun. 28, 2024

(65) Prior Publication Data

US 2026/0002484 A1 Jan. 1, 2026

(51) Int. Cl.

*F02D 41/14* (2006.01)
*F02D 41/04* (2006.01)

(52) U.S. Cl.

CPC ......... *F02D 41/1402* (2013.01); *F02D 41/04* (2013.01); *F02D 2041/141* (2013.01); (Continued)

(58) Field of Classification Search

CPC ................. F02D 41/04; F02D 41/1402; F02D 2041/141; F02D 2041/1412; F02D 2200/1002; F02D 2250/12; F02D 2250/21

See application file for complete search history.

(56) References Cited

U.S. PATENT DOCUMENTS 5,535,135 A * 7/1996 Bush .................. F02D 41/1401 73/23.32
7,006,909 B1 * 2/2006 May ....................... G05B 11/42 701/102

(Continued)

FOREIGN PATENT DOCUMENTS

DE 102009019795 A1 11/2010
EP 3936707 A1 1/2022
WO 2023049124 A1 3/2023

OTHER PUBLICATIONS

Alkeilani, Anwar, “Torque Accuracy Improvement Via Explicit Torque Feedback Control For Internal Combustion Spark Ignition Engines,” Wayne State University, 2016 (137 pages).

Liu Zihao et al: “A Hierarchical Economic Model Predicitive Controller That Exploits Look-Ahead Information of Roads to Boost Engine Performance”, IEEE Transactions on Control Systems Technology, IEEE Service Center, New York, NY, US, vol. 31, No. 6, Nov. 1, 2023 (Nov. 1, 2023), pp. 2632-2643, XP011951880, ISSN: 1063-6536, DOI: 10.1109/TCST.2023.3282051 (12 pages).

(Continued)

*Primary Examiner* — John M Zaleskas

(74) *Attorney, Agent, or Firm* — Osha Bergman Watanabe & Burton LLP

(57) ABSTRACT

An engine for enabling a desired engine torque response of a vehicle includes an electronic control unit (ECU) and actuators. The ECU includes constraint modules and an engine torque control module, which includes an engine setpoint optimizer module, an engine setpoint control module, and actuation blocks. The constraint modules determine a horizon request for the engine. The engine torque control module receives the horizon request. The engine setpoint optimizer module receives the horizon request as an array of engine setpoint quantities (ESQ) and determines an array of Individual Engine Setpoints (IES) based on the array of ESQ. The engine setpoint control module determines actuator setpoints for the actuators to be set to based on the array of IES. The actuation blocks convert the actuator setpoints into voltage signals. The actuators facilitate a combustion reaction in the engine based on the voltage signals.

20 Claims, 10 Drawing Sheets

(52) U.S. Cl.
CPC ................ *F02D 2041/1412* (2013.01); *F02D 2200/1002* (2013.01); *F02D 2250/12* (2013.01); *F02D 2250/21* (2013.01)

(56) References Cited

U.S. PATENT DOCUMENTS

| | | | | |
|---|---|---|---|---|
| 8,116,954 | B2 | 2/2012 | Livshiz et al. | |
| 8,170,759 | B2 | 5/2012 | Jess et al. | |
| 8,997,698 | B1 * | 4/2015 | Roth | F01P 3/08 123/41.35 |
| 10,544,749 | B1 * | 1/2020 | Fedewa | F02D 41/402 |
| 10,961,940 | B1 * | 3/2021 | Anschuetz | F02D 41/1475 |
| 2002/0148447 | A1 * | 10/2002 | Weisman, II | F02D 41/1401 123/480 |
| 2005/0131620 | A1 * | 6/2005 | Bowyer | F02D 41/005 700/29 |
| 2005/0193739 | A1 * | 9/2005 | Brunell | G05B 13/042 60/772 |
| 2006/0137335 | A1 * | 6/2006 | Stewart | F02D 41/0007 60/370 |
| 2006/0243241 | A1 * | 11/2006 | Kuo | F02D 41/3035 123/305 |
| 2007/0068159 | A1 * | 3/2007 | Ueno | F02B 37/12 60/605.2 |
| 2008/0029058 | A1 * | 2/2008 | Duesmann | F02D 41/0002 123/198 F |
| 2008/0257306 | A1 * | 10/2008 | Chen | F02D 41/3011 123/350 |
| 2010/0018483 | A1 * | 1/2010 | He | F02D 13/0265 123/90.15 |
| 2010/0116249 | A1 * | 5/2010 | Guerrassi | F02D 41/2477 123/435 |
| 2010/0318279 | A1 * | 12/2010 | Meyer | F02D 41/1402 701/103 |
| 2013/0298554 | A1 * | 11/2013 | Sellnau | F02B 37/04 60/609 |
| 2014/0174413 | A1 * | 6/2014 | Huang | F02B 47/08 123/568.18 |
| 2014/0174414 | A1 * | 6/2014 | Huang | F02D 41/1401 123/568.21 |
| 2014/0311446 | A1 * | 10/2014 | Whitney | F02D 41/0002 123/344 |
| 2014/0316682 | A1 * | 10/2014 | Whitney | F02D 11/105 701/108 |
| 2014/0316683 | A1 * | 10/2014 | Whitney | F02D 41/005 701/108 |
| 2015/0039206 | A1 * | 2/2015 | Storch | F02D 41/2464 701/103 |
| 2015/0152817 | A1 * | 6/2015 | Roth | F02M 31/042 123/435 |
| 2015/0275783 | A1 * | 10/2015 | Wong | G05B 13/048 701/102 |
| 2015/0275794 | A1 * | 10/2015 | Verdejo | F02D 41/0052 701/108 |
| 2015/0279124 | A1 * | 10/2015 | Wong | G07C 5/00 701/99 |
| 2015/0369146 | A1 * | 12/2015 | Zavala Jurado | F02D 11/105 123/399 |
| 2016/0131061 | A1 * | 5/2016 | Whitney | F02D 41/0002 701/108 |
| 2016/0237927 | A1 * | 8/2016 | Long | F02D 41/0077 |
| 2016/0237932 | A1 * | 8/2016 | Long | F02D 41/0007 |
| 2017/0107920 | A1 * | 4/2017 | Roth | F02D 41/30 |
| 2017/0114748 | A1 * | 4/2017 | Roth | F02D 41/1454 |
| 2017/0122235 | A1 * | 5/2017 | Wong | F02D 41/1401 |
| 2017/0356350 | A1 * | 12/2017 | Li | F02D 41/1406 |
| 2018/0016967 | A1 * | 1/2018 | Moore | F02M 35/10157 |
| 2018/0274453 | A1 * | 9/2018 | Livshiz | F16H 63/502 |
| 2018/0298838 | A1 * | 10/2018 | Pisu | F02D 35/028 |
| 2019/0100217 | A1 * | 4/2019 | Livshiz | B60W 30/188 |
| 2019/0316534 | A1 * | 10/2019 | Liao-McPherson | F02D 41/0052 |
| 2025/0035057 | A1 * | 1/2025 | Zhang | F02D 41/0027 |
| 2025/0137414 | A1 * | 5/2025 | Borhan | B60W 10/08 |

OTHER PUBLICATIONS

Zhu Qilun et al: "A Nonlinear Model Predicitive Control Strategy with a Disturbance Observer for Spark Ignition Engines with External EGR", SAE Int. J. Commer. Veh., vol. 10, No. 1, Mar. 28, 2017 (Mar. 28, 2017), pp. 360-372, XP093312672, ISSN: 1946-3928, DOI: 10.4271/2017-01-0608 (13 pages).

Bakibillah A S M et al: "Eco-driving on Hilly Roads Using Model Predicitive Control", 2018 Joint 7th International Conference on Imformatics, Electronics & Vision (ICIEV) And 2018 2nd International Conference on Imaging, Vision & Pattern Recognition (ICIVPR), IEEE, Jun. 25, 2018 (Jun. 25, 2018), pp. 476-480, XP033518331, DOI: 10.1109/ICIEV.2018.8640987 (5 pages).

Egan Daniel et al: "Use of Machine Learning for Real-Time Non-Linear Model Predictive Engine Control", SAE Technical Paper Series, vol. 1, Apr. 2, 2019 (Apr. 2, 2019), pp. 1-13, XP093312607, DOI: 10.4271/2019-01-1289 (13 pages).

Colin Guillaume et al: "Linearized Neural Predictive Control a Turbocharged SI Engine Application", SAE International, Apr. 11, 2005 (Apr. 11, 2005), XP093312635, Retrieved from the Internet: URL:https://doi.org/10.4271/2005-01-0046 (10 pages).

International Search Report and Written Opinion issued in Application No. PCT/US2025/034813, mailed on Sep. 19, 2025 (15 pages).

* cited by examiner

HORIZON BASED ENGINE CONTROL

BACKGROUND

Gasoline compression ignition (GCI) is a method of gasoline ignition for an internal combustion engine that relies on compressing a mixture of fuel and air in a piston cylinder, resulting in the self-ignition of the fuel and air mixture. Due to the inherent reliance on the air temperature after the air is compressed, a portion of the exhaust gases may be recirculated into the combustion chamber or an air cooler of the engine in a process known as exhaust gas recirculation, or EGR. Recirculating the exhaust gases aids in the combustion process by diluting the combustible mixture with the inert exhaust gases, which reduces the maximum temperature generated by the combustion reaction. The reduced temperature of the diluted combustible mixture allows for the engine to operate at a higher compression ratio and torque output, without damage, by preventing the premature ignition of the mixture.

Coordinated torque control systems have been developed to predict and control a future engine torque output according to a user's future driving needs. Traditional coordinated torque control systems, however, neither predict nor control the engine torque output as accurately as desired. Further, traditional coordinated torque control systems do not provide a rapid response to control signals, and similarly fail to coordinate engine torque control among various devices that affect engine torque output.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An engine for enabling a desired engine torque response of a vehicle includes an electronic control unit (ECU) and actuators. The ECU includes constraint modules and an engine torque control module, which includes an engine setpoint optimizer module, an engine setpoint control module, and actuation blocks. The constraint modules determine a horizon request for the engine. The engine torque control module receives the horizon request. The engine setpoint optimizer module receives the horizon request as an array of engine setpoint quantities (ESQ) and determines an array of Individual Engine Setpoints (IES) based on the array of ESQ. The engine setpoint control module determines actuator setpoints for the actuators to be set to based on the array of IES. The actuation blocks convert the actuator setpoints into voltage signals. The actuators facilitate a combustion reaction in the engine based on the voltage signals.

A method for enabling a desired engine torque response of a vehicle includes determining a horizon request for an engine based on input from a user. In addition, the method includes receiving the horizon request from constraint modules. Furthermore, the method includes receiving the horizon request as an array of engine setpoint quantities (ESQ) and determining an array of Individual Engine Setpoints (IES) based on the array of ESQ. Subsequently, the method includes expressing each IES in terms of timing, split percentage, pressure, flow, temperature, or mass. Additionally, the method includes determining actuator setpoints for the actuators to be set to based on the array of IES. The method further includes converting the actuator setpoints into voltage signals. Finally, the method includes facilitating a combustion reaction in the engine via a plurality of actuators, where each actuator receives a corresponding voltage signal and operates based upon the corresponding voltage signal.

Other aspects and advantages of the claimed subject matter will be apparent from the following description and appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the present invention are directed towards a software control method and system for coordinating a plurality of actuators to control a response of a vehicle as a whole in order to enable a desired engine torque response of the vehicle. The system includes an engine, a plurality of actuators, and an electronic control unit (ECU). The ECU may include a memory, a central processing unit (CPU), a plurality of constraint modules, and an engine torque control module. By determining a plurality of actuation system response (ASR) times of the plurality of actuators in combination with predicting a required future torque based on user input, the proposed design advantageously reduces shock related to acceleration of the vehicle and provides the user with a comfortable driving experience.

Figure 1:
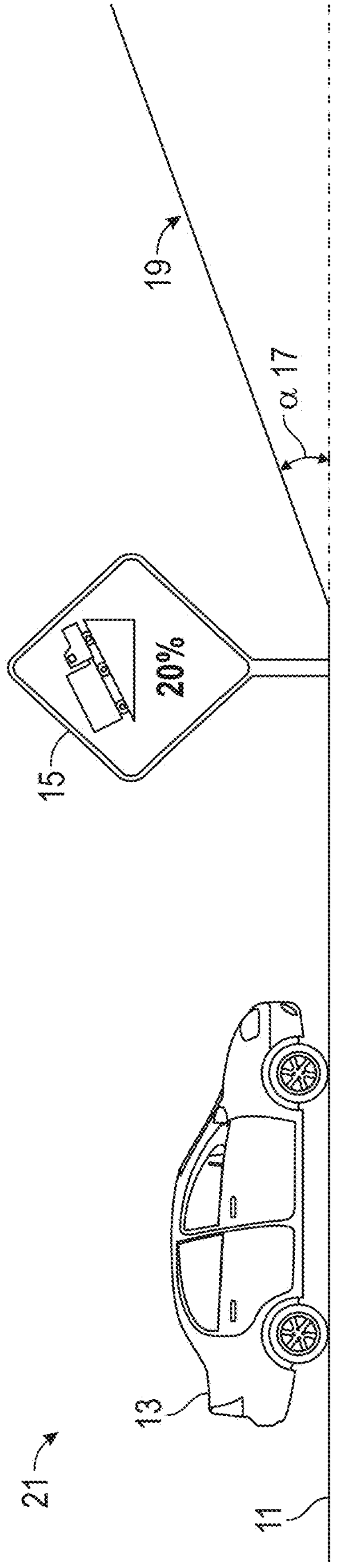
FIG. 1 depicts a vehicle traversing an environment in accordance with one or more embodiments disclosed herein.

FIG. 1 shows a schematic diagram illustrating an example of a vehicle 13 approaching a slope 19 in a driving environment 21 in accordance with one or more embodiments of the invention. In general, driving environments 21 are configured in a myriad of ways. Therefore, the driving environment 21 is not intended to limit the particular configuration of the system. For example, the driving environment 21 is depicted as having a slope 19 inclined at an angle of α 17 and a pavement driving surface 11. The angle α 17 is designated by the road grade sign 15 showing a road grade of 20%. A road grade of 20% is equivalent to an angle of 11.3 degrees, or 0.1972 radians. Alternatively, the driving environment 21 can have slopes 19 of varying grades, ranging from negative grades, zero grade, or positive grades.

Figure 5:
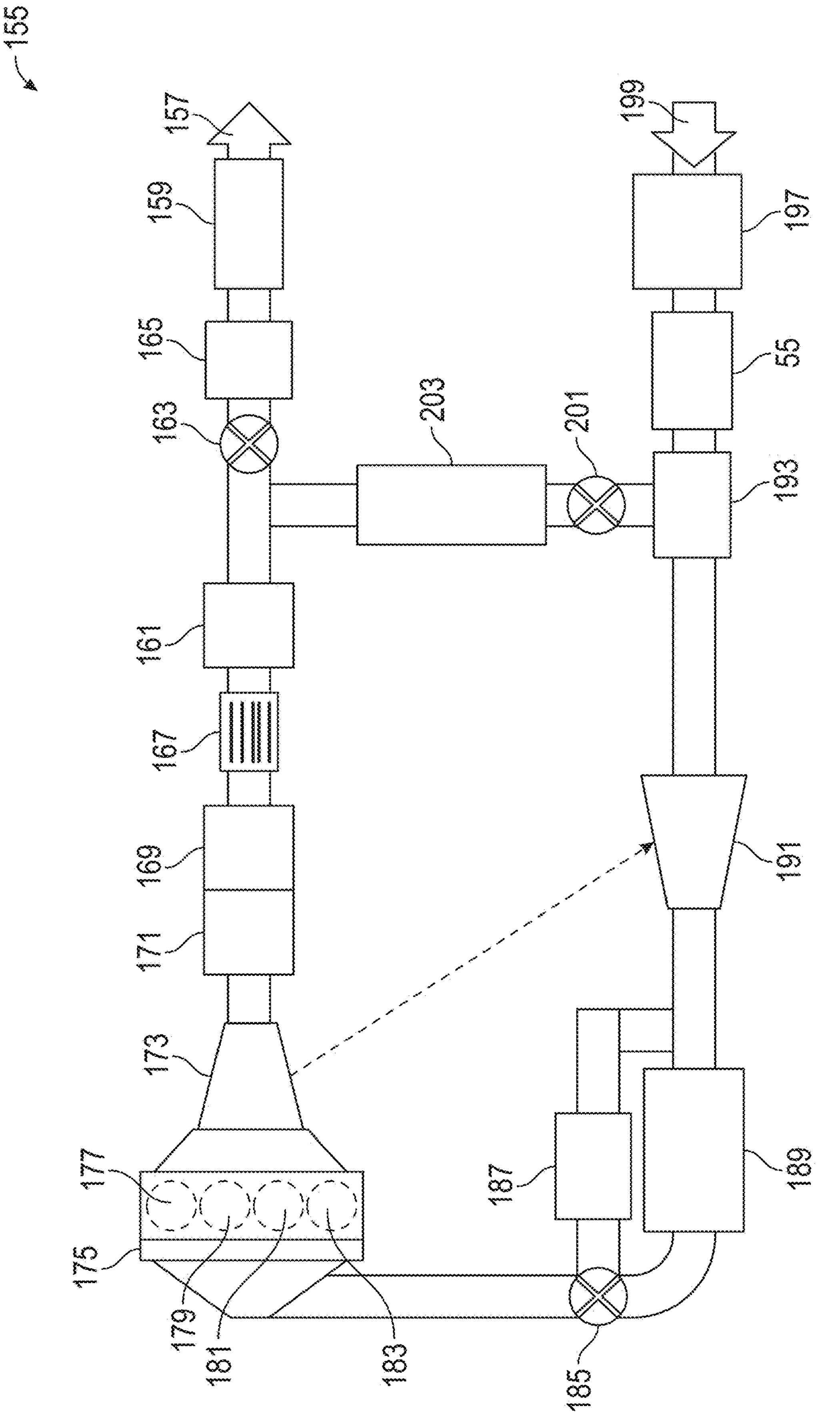
FIG. 5 depicts a diagram of an engine in accordance with one or more embodiments disclosed herein.

As a vehicle 13 approaches a positively inclined slope 19, the user would push an accelerator pedal to request additional torque from the engine (e.g., FIG. 5). The electronic control unit (ECU) (e.g. FIG. 3) anticipates future required torque values derived from the user's current driving actions, and creates an array of anticipated future values called a horizon request (e.g., FIG. 2). The horizon request (e.g., FIG. 2) is interpreted such that the user's needs are met within one second, however an operator may configure the system to meet the user's needs within a time range of 0.1 seconds, 0.5 seconds, 1 second, 2 seconds, 5 seconds, or any conceivable time value in the future. However, it is noted that 1 second is an ideal time to anticipate future values and successfully meet the acceleration needs of the user.

Figure 2:
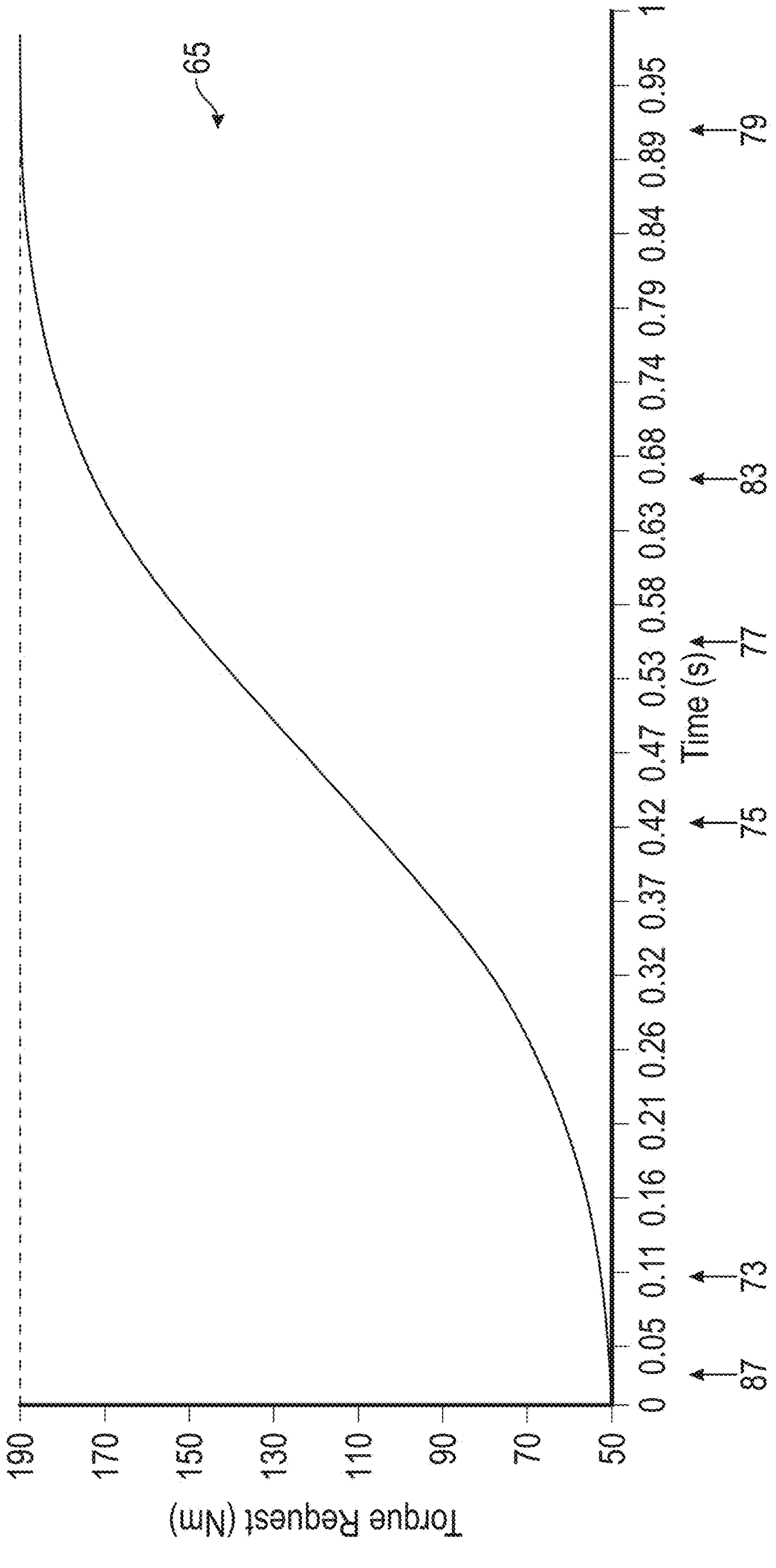
FIG. 2 shows a graph of torque request versus time in accordance with one or more embodiments disclosed herein.

Turning to FIG. 2, FIG. 2 shows a plot of requested torque, in Newton meters, versus time, in seconds. In accordance with FIG. 1, the plot of FIG. 2 provides an example of the torque requested by a user as a vehicle 13 approaches a positively inclined slope 19 in a driving environment 21. As shown in the plot, requested values of torque within a period of one second into the future are anticipated by the electronic control unit (ECU) (e.g., FIG. 3).

The plot of FIG. 2 shows the ECU (e.g., FIG. 3) predicting the future torque needs of a user for the next one second as the user approaches the positively inclined slope 19. The future required torque is stored as a horizon request 65 comprising an array of anticipated future torque values. If, within a time period of anticipating the horizon request 65, in this case the next one second, a user requires a different amount of torque, which may be due to traffic and/or obstacles in the road (i.e., a pothole, an animal, a traffic cone, etc.), the ECU (e.g., FIG. 3) must create a new horizon request 65 based on the new information.

Figure 3:
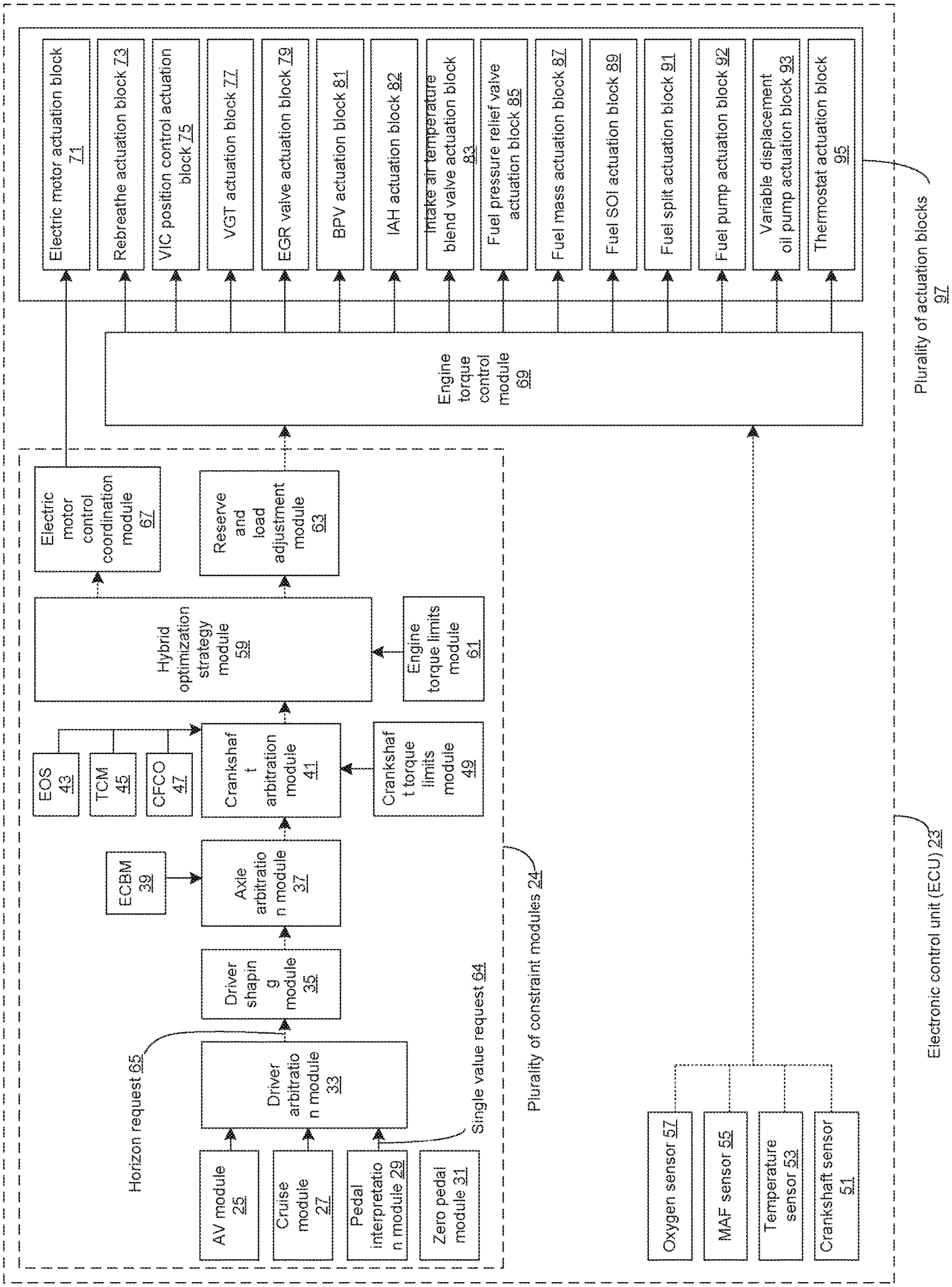
FIG. 3 depicts a flowchart of a system in accordance with one or more embodiments disclosed herein.

The arrows with accompanying numbers disposed at different points in time along the bottom axis of the plot identify the timing at which the respective actuators of the plurality of actuators complete actuation according to a corresponding voltage signal provided by a corresponding actuation block (e.g., FIG. 3). For instance, the fuel rail control valve (not shown), which regulates the amount of fuel injected into the cylinders of the engine (e.g., FIG. 5) and is associated with a fuel mass actuation block 87, completes actuation quickly in response to a system command and is shown completing actuation at the beginning of the horizon request 65. Fuel is required in order for the combustion process to occur, and the energy from the combustion of fuel in the engine (e.g., FIG. 5) is converted to energy in the form of torque. Thus, regulating the amount of fuel provided results in regulating the amount of torque that may be output. Next, the tri-roller Roller Finger Follower (RFF) (e.g., FIG. 6), which is associated with a rebreathe actuation block 73, completes actuation within the next 0.1 seconds in order to determine whether the engine (e.g., FIG. 5) will operate in a normal mode or a rebreathe mode. The engine (e.g., FIG. 5) typically operates in rebreathe mode during low-load conditions which is further discussed in relation to FIG. 6, below, and operates in the normal mode, which is the standard and/or default mode of the engine (e.g., FIG. 5). In this scenario of the vehicle 13 driving up an inclined slope 19, the tri-roller RFF (e.g., FIG. 6) would not be actuated because the load conditions are high, and the engine (e.g., FIG. 5) may operate in the normal mode.

Continuing with FIG. 2, the variable inlet compressor (VIC) (not shown), which is associated with a VIC position control actuation block 75, completes actuation at approximately 0.42 seconds into the torque horizon request 65. The VIC controls the flow of intake air into a turbo charger's compressor (e.g., FIG. 5). At around 0.42 seconds in the plot of FIG. 2, it can be seen that the amount of torque requested begins to increase, and thus the VIC should actuate to allow more air into the compressor (e.g., FIG. 5) to drive the turbine (e.g., FIG. 5) of the turbo charger in order to output more torque. The variable geometry turbo (VGT) (not shown), which is associated with a VGT actuation block 77, completes actuation between 0.53 and 0.58 seconds in FIG. 2. The VGT regulates exhaust gases through a turbine (e.g., FIG. 5) from the combustion process. The VGT may actuate after the VIC which is related to the compressor (e.g., FIG. 5), because a shaft of the turbine (e.g., FIG. 5) is connected to the compressor (e.g., FIG. 5). The intake air temperature blend valve (e.g., FIG. 5), which is associated with an intake air temperature blend valve actuation block 83, facilitates the blending of hot and cold air in the engine (e.g., FIG. 5) in order to reach an optimal air temperature for the combustion process. The intake air temperature blend valve (e.g., FIG. 5) completes actuation at approximately 0.66 seconds in FIG. 2, and blends air that has been passed through a hot and cold charge air cooler (CAC) (e.g., FIG. 5) in order to achieve a desired air temperature to maximize efficiency of the combustion process. Finally, the exhaust gas recirculation (EGR) valve (e.g., FIG. 5), which is associated with an EGR valve actuation block 79, completes actuation at approximately 0.9 seconds in FIG. 2. The EGR valve (e.g., FIG. 5) regulates the flow of exhaust gases recirculated in the intake portion of the engine (e.g., FIG. 5) after being cooled down. It is noted that not all of the actuators are shown at the time that actuation is completed in FIG. 2, and the timing and combination of actuators used may vary in alternative driving scenarios.

Further, it is noted that the actuators in FIG. 2 require different amounts of time to respond to a system command.

In this way, tri-roller RFF (e.g., FIG. 6), the VIC, the VGT, the intake air temperature blend valve (e.g., FIG. 5), and the EGR valve (e.g., FIG. 5) receive system commands before the fuel rail control valve in order to compensate for the time between receiving a system command and completing actuation. Specifically, the EGR valve (e.g., FIG. 5), due to its slow response time, receives a system command before the other actuators in order to complete actuation at the desired time. Similarly, the tri-roller RFF (e.g., FIG. 6) is actuated hydraulically, and may receive a system command significantly before the desired actuation time. In addition, the fuel rail valve has a near instantaneous response time between receiving a system command and completing actuation, and thus may receive a system command at nearly the same time that completion of the actuation is desired. Different actuators require different times to actuate after receiving a system command, which is discussed below.

Turning to FIG. 3, FIG. 3 shows an electronic control unit (ECU) 23 that is configured to control a plurality of actuators of an engine (e.g., FIG. 5) based on user input. The ECU 23 may include a memory (e.g., FIG. 8) and a central processing unit (CPU) (e.g., FIG. 8) that respectively serve to store and execute computer readable instructions. The computer readable instructions include information regarding the conditions (i.e., timing, engine temperature, pressure, duration, etc.) for actuating a particular component of the engine (e.g., FIG. 5). The ECU 23 further includes a plurality of constraint modules 24 an engine torque control module 69, and a plurality of actuation blocks 97.

The plurality of constraint modules 24 are configured to determine a horizon request 65 for the engine (e.g., FIG. 5) based on input from a user. The horizon requests 65 from the plurality of constraint modules 24 are typically in units of torque in order for the system to communicate in a coordinated manner. The units of torque may be in brake torque, axle torque, engine torque, or other forms of torque that a person of ordinary skill in the art could use to coordinate a system with. The engine torque control module 69 receives the horizon request 65 from the plurality of constraint modules 24 in order to control the plurality of actuators. However, the final horizon request 65 from the plurality of constraint modules 24 is converted from units of torque to units of Engine Setpoint Quantity (ESQ), which will be discussed further below in relation to FIG. 4.

The initial inputs of the plurality of constraint modules 24, whose inputs are single value requests 64 interpreted in units of axle torque, are: an autonomous vehicle (AV) module 25, a cruise module 27, and a pedal interpretation module 29. The AV module 25 uses cameras to detect the conditions of the driving environment 21 and determines an axle torque request for the vehicle 13 to achieve a driver requested path plan. The cruise module 27 determines an axle torque request for the vehicle 13 to achieve a desired speed when a cruise control system is active. The pedal interpretation module 29 indicates the acceleration requests and deceleration requests of the vehicle 13 as the user presses the accelerator pedal and/or the brake pedal of the vehicle 13. FIG. 3 includes a zero pedal module 31 which indicates that the accelerator pedal is not sending a request, however the plurality of constraint modules 24 do not require an input from the zero pedal module 31.

The single value requests 64 from the AV module 25, cruise module 27, and pedal interpretation module 29 are interpreted by a driver arbitration module 33. The driver arbitration module 33 arbitrates between the single value requests 64 and determines which request to use based on hierarchical logic. The hierarchical logic may be designated by a manufacturer, and may proceed in the following manner: the AV module 25 is considered first, which relates to driving the vehicle 13 autonomously, then if the cruise control system is active, the arbitration will take the greater torque request between the pedal interpretation module 29, which relates to a user actively sending acceleration and/or deceleration requests, and the cruise module 27, which relates to a user maintaining a constant cruising speed. Therefore, the winning single value request 64 between the AV module 25, cruise module 27, and the pedal interpretation module 29 is sent to a driver shaping module 35 in the form of a horizon request 65 with units of axle torque. The horizon request 65 comprises an array of anticipated future torque values in order to provide a user with a smooth transition from a current velocity to a future velocity.

The driver shaping module 35 shapes the horizon request 65 from the driver arbitration module 33, which comprises an array of anticipated torque values, over a manufacturer-defined time period in the future. For example, the horizon request 65 may range from 0.1 seconds to 10 seconds in the future, with alternative ranges able to be implemented at the discretion of a manufacturer. The plot of torque requests versus time in FIG. 2 provides an example of the driver shaping module 35 determining a horizon request 65 for the next one second into the future. The driver shaping module 35 shapes the torque requests over time to have a smooth curve in order to avoid sudden shocks to a user and provide a comfortable driving experience.

After the driver shaping module 35, the modified horizon request 65 is sent to an axle arbitration module 37. The axle arbitration module 37 arbitrates the driver request against various features such as traction control and vehicle overspeed protection. In FIG. 3, an electronic brake control module (EBCM) 39 is input to the axle arbitration module 37 as either a single value request 64 or a horizon request 65 in addition to the horizon request 65 from the driver shaping module 35. The EBCM 39 is a microprocessor configured to control the electronic components of the brake system in a vehicle 13 and monitors information regarding wheel speed and the automatic braking system (ABS). The axle arbitration module 37 is configured to modify the horizon request 65 from the driver shaping module 35 based on the ABS information received from the EBCM 39. The axle arbitration module 37 sends the modified horizon request 65 to a crankshaft arbitration module 41, where the horizon request 65 is translated to units of crankshaft torque by way of the transmission gear ratios.

The crankshaft arbitration module 41 is provided with additional inputs from modules including an engine overspeed (EOS) module 43, transmission control module (TCM) 45, clutch fuel cut-off (CFCO) module 47, and crankshaft torque limits module 49. The EOS module 43 measures the speed of the engine (e.g., FIG. 5) and sends a signal to the crankshaft arbitration module 41 when the speed of the engine (e.g., FIG. 5) exceeds a predetermined threshold. The TCM 45 coordinates gear shifting and transmission operation of the engine based on factors such as the speed of the vehicle 13, engine load, and driver input. The CFCO module 47 measures the status of the clutch, including whether it is engaged or disengaged, and regulates fuel delivery to the engine (e.g., FIG. 5) depending on the status of the clutch. The crankshaft torque limits module 49 is configured to control the amount of torque produced by the crankshaft such that the engine operates within a safe and optimal torque limit to prevent mechanical stress, damage, or failure. In the instance of a vehicle 13 that is a hybrid vehicle, the crankshaft arbitration module 41 may output the modified horizon request 65 in units of crankshaft torque to a hybrid optimization strategy module 59.

The hybrid optimization strategy module 59 receives an additional input from an engine torque limits module 61. The engine torque limits module 61 is configured to control the amount of torque produced by the engine (e.g., FIG. 5), similar to how the crankshaft torque limits module 49 controls the amount of torque produced by the crankshaft. The hybrid optimization strategy module 59 determines, based on current operating load conditions, between using the engine or an electric motor in the case that the vehicle 13 is a hybrid. After the hybrid optimization strategy module 59 completes its determination between the engine and electric motor, the modified horizon request 65 is sent, in units of crankshaft torque, to an electric motor control coordination module 67 and a reserve and load adjustment module 63. The electric motor control coordination module 67, which sends a single value request 64 or a horizon request 65 to the electric motor actuation block 71, coordinates the use of the electric motor in accordance with the operating needs of the engine (e.g., FIG. 5). The electric motor actuation block 71 is configured to turn on and off the electric motor (not shown) of the vehicle 13 depending on driving conditions and power demands. The hybrid optimization strategy module 59 derives its determination from information regarding vehicle 13 speed and load conditions. For instance, the electric motor (not shown) is typically used in low-load conditions, such as when the vehicle 13 maintains a constant cruising speed. Further, both the electric motor (not shown) and the engine (e.g., FIG. 5) may be used at the same time, or they may be used separately. In all instances, the modified torque horizon request 65 is sent to both the electric motor control coordination module 67 and the reserve and load adjustment module 63.

The reserve and load adjustment module 63 is used to offset the requested torque taking into account auxiliary power-consuming components of the vehicle 13, such as an air conditioning system. The reserve and load adjustment module 63, after offsetting the requested torque, sends the modified horizon request 65, in units of brake torque, to a brake to Engine Setpoint Quantity (ESQ) module (e.g., FIG. 4) which is discussed below in relation to FIG. 4. The brake to ESQ module (e.g., FIG. 4) sends the horizon request 65 in units of ESQ to an engine torque control module 69 configured to process the horizon request 65 from the plurality of constraint modules 24 in order to control a plurality of actuators.

Further, the engine torque control module 69 receives additional input from a crankshaft sensor 51, a temperature sensor 53, a mass airflow (MAF) sensor 55, and an oxygen sensor 57. The crankshaft sensor 51 is configured to measure the rotational speed of the crankshaft. The temperature sensor is configured to measure the temperature of the air in the engine (e.g., FIG. 5). The MAF sensor 55 is configured to measure the amount of air entering the intake of the engine (e.g., FIG. 5). The oxygen sensor 57 is configured to measure the amount of oxygen present in the exhaust gases of the engine (e.g., FIG. 5). The sensors 51, 53, 55, and 57 provide measurements of the respective aspects of the vehicle 13 to the engine torque control module 69 in order to assist in coordinating the plurality of actuators to achieve a desired engine torque response.

The plurality of actuators receive corresponding commands in the form of voltage signals from a plurality of actuation blocks 97. The plurality of actuation blocks 97 comprise an electric motor actuation block 71, a rebreathe actuation block 73, a variable inlet compressor (VIC) position control actuation block 75, a variable geometry turbo (VGT) actuation block 77, an exhaust gas recirculation (EGR) valve actuation block 79, a back pressure valve (BPV) actuation block 81, an intake air heater (IAH) actuation block 82, an intake air temperature blend valve actuation block 83, a fuel pressure relief valve actuation block 85, a fuel mass actuation block 87, a fuel start of injection (SOI) actuation block 89, a fuel split actuation block 91, a fuel pump actuation block 92, a variable displacement oil pump actuation block 93, and a thermostat actuation block 95. The engine torque control module 69 and the plurality of actuation blocks 97 will be discussed further below in relation to FIG. 4.

Figure 4:
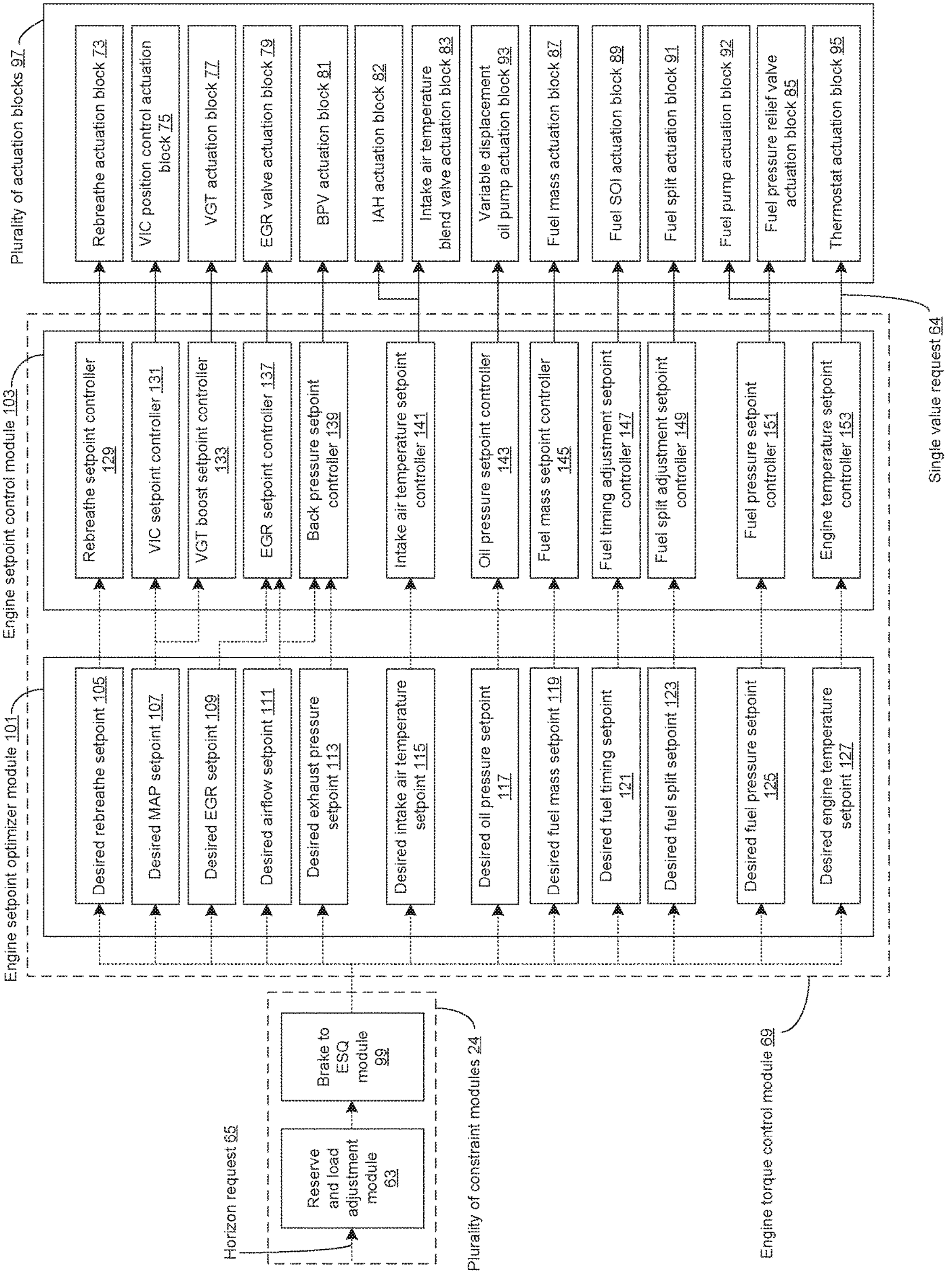
FIG. 4 depicts a flowchart of a system in accordance with one or more embodiments disclosed herein.

Turning to FIG. 4, FIG. 4 shows the engine torque control module 69 and a plurality of actuation blocks 97. The engine torque control module 69 receives input from a reserve and load adjustment module 63 and a brake to Engine Setpoint Quantity (ESQ) module 99. The reserve and load adjustment module 63 and the brake to ESQ module 99 are two of the plurality of constraint modules 24. As previously discussed, the reserve and load adjustment module 63 determines an offset for the requested torque taking into account necessary adjustments such as a load due to an air conditioning system. Further, the reserve and load adjustment module 63 sends a horizon request 65, in units of brake torque, to the brake to ESQ module 99. The brake to ESQ module 99 converts the horizon request 65, in units of brake torque, into a horizon request 65 comprising an array of ESQ. ESQ is typically represented as an Indicated Mean Effective Pressure (IMEP) or a Net Mean Effective Pressure (NMEP) or a Brake Mean Effective Pressure (BMEP). As is commonly known in the art, the IMEP of the engine (e.g., FIG. 5) is derived, in part, from the torque produced by the crankshaft (not shown) of the engine (e.g., FIG. 5) and the collective displacement volume of the cylinders (e.g., FIG. 5). The IMEP reflects the generalized capacity of the engine (e.g., FIG. 5) to output work, which is related to the internal pressure acting upon the pistons (not shown).

The engine torque control module 69 comprises an engine setpoint optimizer module 101 and an engine setpoint control module 103. The engine setpoint optimizer module 101 receives the horizon request 65, in the form of an array of ESQ with units of the desired ESQ from the brake to ESQ module 99, and determines an array of Individual Engine Setpoints (IES) in terms of timing, split percentage, pressure, flow, temperature, and mass. The array of IES may be determined using an engine map, and/or an artificial neural network, and/or a feedback model, and/or a feedforward model. However, the array of IES is typically determined with engine maps that most often receive an input of an array of ESQ and revolutions per minute (RPM) of the crankshaft of the vehicle 13. The engine maps may then output, based on the input array of ESQ and RPM, the array of IES comprising: desired rebreathe setpoint 105, desired Manifold Absolute Pressure (MAP) setpoint 107, desired exhaust gas recirculation (EGR) setpoint 109, desired airflow setpoint 111, desired exhaust pressure setpoint 113, desired intake air temperature setpoint 115, desired oil pressure setpoint 117, desired fuel mass setpoint 119, desired fuel timing setpoint 121, desired fuel split setpoint 123, desired fuel pressure setpoint 125, and desired engine temperature setpoint 127. In addition, there are typically piston temperature offsets and barometric pressure offsets taken into account by the engine setpoint optimizer module 101 when determining the desired setpoints. For example, the engine (e.g., FIG. 5) may need to run with a higher boost pressure or a higher intake air temperature when the piston is cold during warmup.

The engine setpoint optimizer module 101 is configured to receive the horizon request 65 as an array of ESQ and determine an array of IES based on the array of ESQ. In addition, the engine setpoint optimizer module 101 may use an engine map that is a function of engine speed to calculate a plurality of time delays, where each time delay corresponds to the time elapsed between sending an individual actuator of the plurality of actuators a command and receiving a system response from the individual actuator of the plurality of actuators. The engine setpoint optimizer module 101 stores the plurality of time delays as a plurality of Actuator System Responses (ASR). The engine setpoint optimizer module 101 compensates the array of IES for the plurality of ASR of the plurality of actuators in order to find a desired array of IES that may optimize performance and efficiency of the engine (e.g., FIG. 5).

The array of IES from the engine setpoint optimizer module 101 outputs a plurality of horizon requests 65 to the engine setpoint control module 103. The engine setpoint control module 103 determines a setpoint for each actuator of the plurality of actuators based on the associated IES from the array of IES. For example, the desired rebreathe setpoint 105 outputs a horizon request 65 to a rebreathe setpoint controller 129, while the desired airflow setpoint 111 outputs a horizon request 65 to both of an EGR setpoint controller 137 and a back pressure setpoint controller 139. The setpoint controllers may receive inputs from a plurality of IESs, and a plurality of IESs may output to a plurality of setpoint controllers. Additional setpoint controllers not already mentioned include a VIC setpoint controller 131, a VGT boost setpoint controller 133, an intake air temperature setpoint controller 141, an oil pressure setpoint controller 143, a fuel mass setpoint controller 145, a fuel timing adjustment setpoint controller 147, a fuel split adjustment setpoint controller 149, a fuel pressure setpoint controller 151, and an engine temperature setpoint controller 153.

The engine setpoint control module 103 is configured to determine a plurality of actuator setpoints for the plurality of actuators based on the array of IES and the plurality of ASR of the plurality of actuators. The determination is ideally achieved by way of an engine map, however an artificial neural network and/or a feedback model and/or a feedforward model may be used as well. An engine map is preferred when it is more than 85% accurate and a model can fit into 2-dimensional tables. An artificial neural network, or 3D (or higher dimensional) data driven model, is preferred when the relationship between input and output requires more than two dimensions. At least one of a feedback model and/or a feedforward model are preferred when measured and predicted information may be used, respectively, to compensate for each ASR associated with each actuator of the plurality of actuators in order to control the operation of the engine (e.g., FIG. 5) as desired with greater than 85% accuracy.

The following methods are implemented by the respective setpoint controllers in order to determine the setpoints of the actuators. For example, the rebreathe setpoint controller 129, the VIC setpoint controller 131, the intake air temperature setpoint controller 141, and the fuel pressure setpoint controller 151 typically utilize an engine map to determine each setpoint. Further, the VGT boost setpoint controller 133 may use an artificial neural network to determine each setpoint. Finally, the EGR setpoint controller 137 and the back pressure setpoint controller 139 may use at least one of a feedback model and/or a feedforward model to determine each setpoint. The remaining setpoint controllers may not require the use of a model and may pass the outputs from the engine setpoint optimizer module 101 directly to the actuation blocks 97. However, the remaining setpoint controllers may use models, typically an engine map, at an operator's discretion.

The engine setpoint control module 103 outputs a single value request 64 for each setpoint controller 129-153 of the engine setpoint control module 103 instead of a horizon request 65. The plurality of single value requests 64 includes a sufficient lead in the signal to anticipate and match the plurality of ASR of the plurality of actuators. The engine setpoint control module 103 outputs a plurality of actuator setpoints, which are received by the plurality of actuation blocks 97.

Further, with respect to the engine setpoint control module 103, special logic is required in order to handle transient responses that fail to meet the desired requirements when operating at their fastest speed. For example, when a decrease in torque is desired, the array of IES would typically require a decrease in boost pressure while requiring an increase in intake air temperature. However, the increase in intake air temperature requires more time than the decrease in boost pressure. For this reason, the IES associated with boost pressure (i.e., the desired MAP setpoint 107) must take into account the difference between the desired intake air temperature setpoint 115 and the current intake air temperature so that the timing of the plurality of actuators may be coordinated. Boost pressure is a measure of the air pressure generated by a turbine (e.g., FIG. 5) when the turbine (e.g., FIG. 5) forces additional air into the engine (e.g., FIG. 5) to increase the amount of air available for combustion.

The plurality of actuation blocks 97 associated with operation of the engine (e.g., FIG. 5) may comprise a rebreathe actuation block 73, a VIC position control actuation block 75, a VGT actuation block 77, an EGR valve actuation block 79, a back pressure valve (BPV) actuation block 81, an intake air heater (IAH) actuation block 82, an intake air temperature blend valve actuation block 83, a variable displacement oil pump actuation block 93, a fuel mass actuation block 87, a fuel start of injection (SOI) actuation block 89, a fuel split actuation block 91, a fuel pump actuation block 92, a fuel pressure relief valve actuation block 85, and a thermostat actuation block 95. The plurality of actuation blocks 97 each convert the plurality of actuator setpoints into a plurality of voltage signals, and send each actuator of the plurality of actuators a corresponding voltage signal of the plurality of voltage signals in order for each actuator to operate based upon the corresponding voltage signal to collectively facilitate a combustion reaction in the engine (e.g., FIG. 5). The plurality of actuation blocks 97 are discussed in further detail below.

Figure 6:
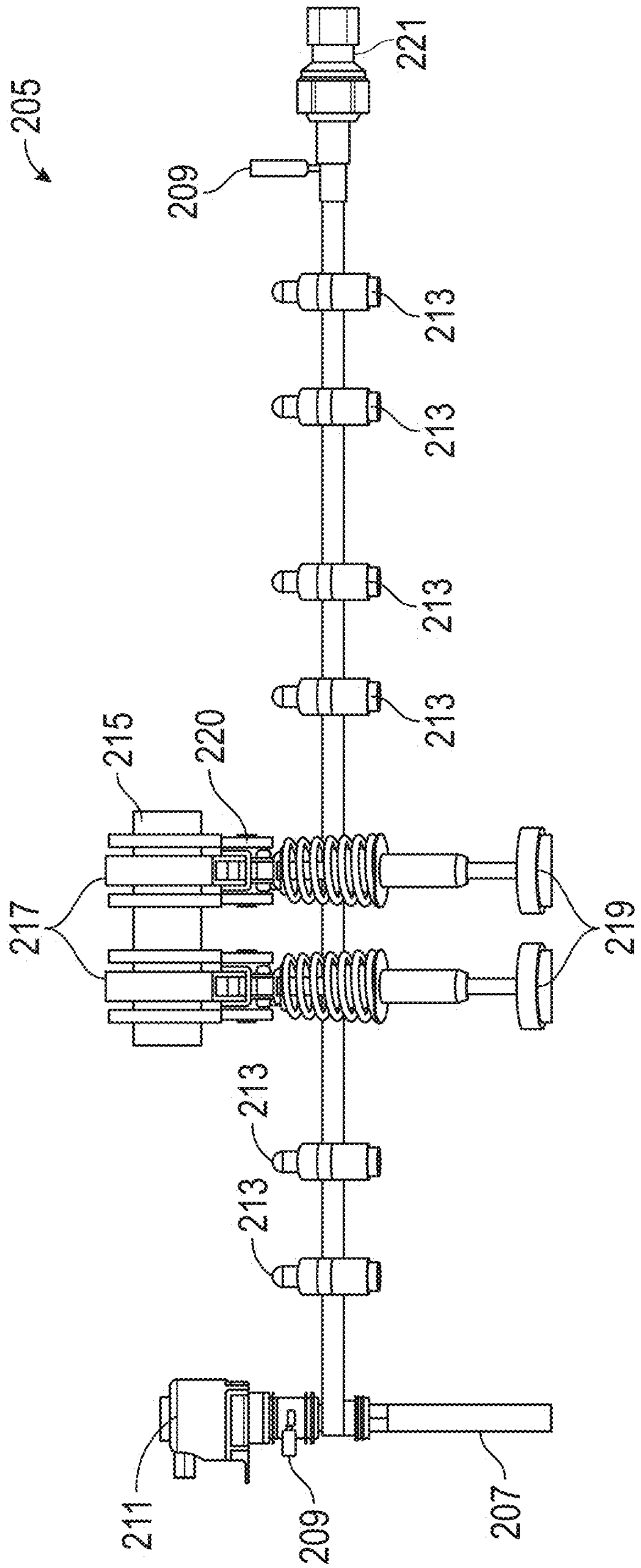
FIG. 6 depicts a micro view of an oil gallery in accordance with one or more embodiments disclosed herein.
Figure 7:
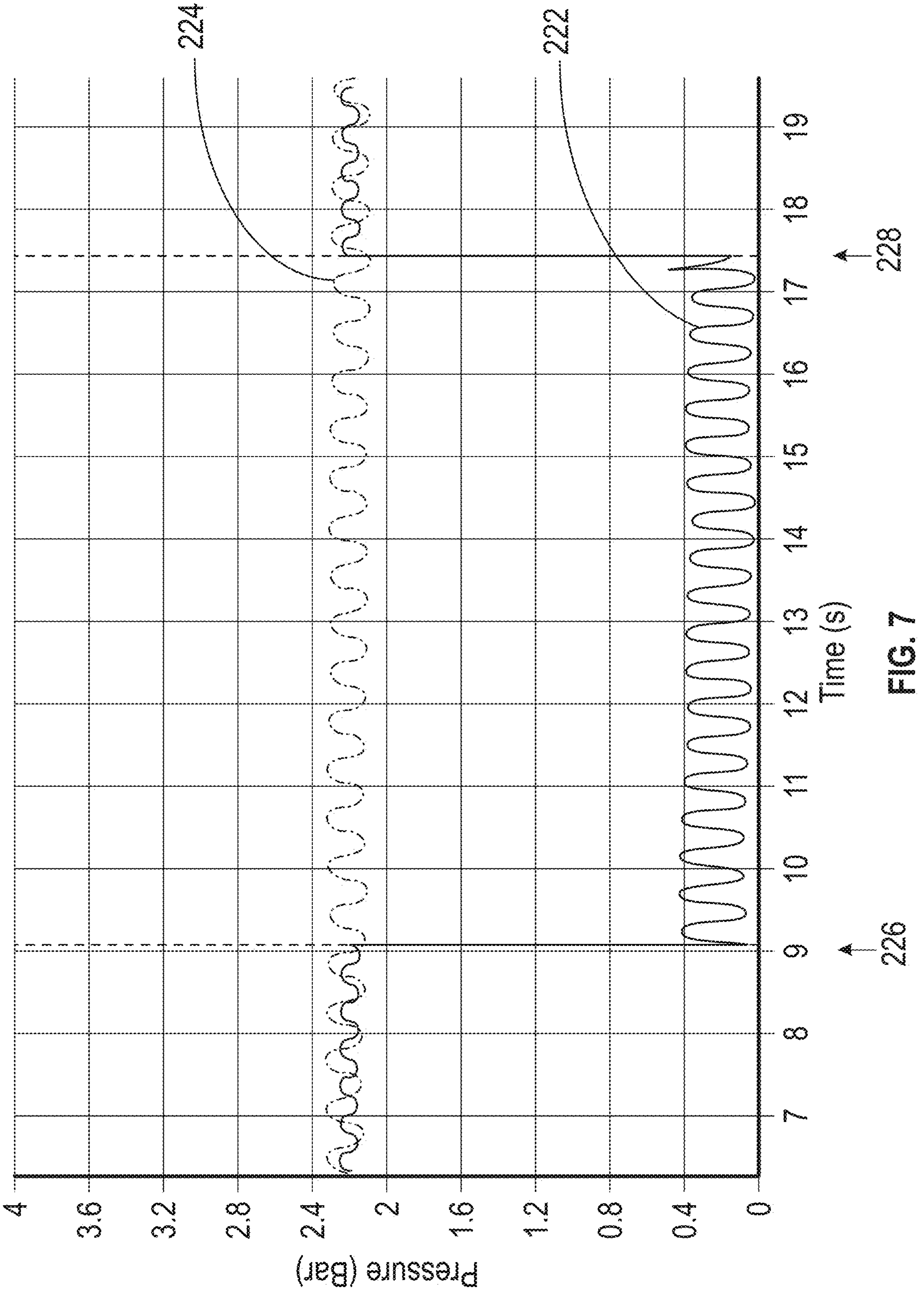
FIG. 7 shows a graph of pressure versus time of an engine in accordance with one or more embodiments disclosed herein.

The rebreathe actuation block 73 is configured to control the tri-roller RFF (e.g., FIG. 6) in order to turn "on" and "off" the rebreathe mode of the engine (e.g., FIG. 5) based on driving load conditions, which is described further in relation to FIGS. 6 and 7. The rebreathe actuation block 73 receives input from the rebreathe setpoint controller 129, which receives input from the desired rebreathe setpoint 105. The VIC position control actuation block 75 controls the VIC (not shown) which controls the amount of air that is allowed to flow through the compressor (e.g., FIG. 5). The VIC position control actuation block 75 receives input from the VIC setpoint controller 131, which receives input from the desired MAP setpoint 107. The VGT actuation block 77 receives input from the VGT boost setpoint controller 133, which receives input from the desired MAP setpoint 107. The VGT actuation block 77 is configured to control the VGT (not shown) which controls the air that is allowed to flow through the turbine (e.g., FIG. 5). Specifically, the VGT controls moveable vanes within the turbine (e.g., FIG. 5).

The EGR valve actuation block 79 receives input from the EGR setpoint controller 137, which receives input from both the desired EGR setpoint 109 and the desired airflow setpoint 111. The EGR valve actuation block 79 controls the opening and/or closing of the EGR valve (e.g., FIG. 5) of the engine (e.g., FIG. 5), which regulates the flow of exhaust gases from an EGR cooler (e.g., FIG. 5) to be recirculated in the intake portion of the engine (e.g., FIG. 5). The BPV actuation block 81 receives input from the back pressure setpoint controller 139, which receives input from both the desired airflow setpoint 111 and the desired exhaust pressure setpoint 113. The BPV actuation block 81 controls the opening and/or closing of the BPV (e.g., FIG. 5) in order to regulate the flow of exhaust gases to regulate exhaust back pressure, as well as creating enough pressure for the exhaust gases to flow through the EGR valve (e.g., FIG. 5).

The IAH actuation block 82 and the intake air temperature blend valve actuation block 83 both receive input from the intake air temperature setpoint controller 141, which receives input from the desired intake air temperature setpoint 115. The IAH actuation block 82 controls the operation of the IAH (e.g., FIG. 5), which heats the intake air entering the combustion chamber (not shown) of the engine (e.g., FIG. 5). The intake air temperature blend valve actuation block 83 controls the opening and closing of the intake air temperature blend valve (e.g., FIG. 5) which facilitates the mixing of heated and cooled intake air in order to achieve a desired intake air temperature.

The variable displacement oil pump actuation block 93 receives input from the oil pressure setpoint controller 143, which receives input from the desired oil pressure setpoint 117. The variable displacement oil pump actuation block 93 controls the variable displacement oil pump (not shown) which regulates the flow of oil to various components of the engine through the main oil gallery pump (not shown), including the oil gallery (e.g., FIG. 6). The fuel start of injection (SOI) actuation block 89 receives input from the fuel timing adjustment setpoint controller 147, which receives input from the desired fuel timing setpoint 121. The fuel SOI actuation block 89 controls the timing of when fuel injectors (not shown) start to deliver fuel into the cylinders (e.g., FIG. 5) of the engine (e.g., FIG. 5) in order to optimize combustion timing and efficiency. The fuel mass actuation block 87 receives input from the fuel mass setpoint controller 145, which receives input from the desired fuel mass setpoint 119. The fuel mass actuation block 87 controls the total amount of fuel that is delivered, via the fuel rail control valve (not shown), into the cylinders (e.g., FIG. 5) of the engine (e.g., FIG. 5) during fuel injection, and thus controls the total amount of fuel available for injection after the fuel SOI actuation block 89 has indicated the start of the fuel injection process.

The fuel split actuation block 91 receives input from the fuel split adjustment setpoint controller 149, which receives input from the desired fuel split setpoint 123. The fuel split actuation block 91 controls the distribution of fuel to be injected into the cylinders (e.g., FIG. 5) from the fuel injectors (not shown) in order to achieve a desired fuel distribution pattern that optimizes combustion performance. The fuel pump actuation block 92 and the fuel pressure relief valve actuation block 85 receive input from the fuel pressure setpoint controller 151, which receives input from the desired fuel pressure setpoint 125. The fuel pump actuation block 92 controls the fuel pump (not shown) in order to regulate the flow of fuel from the fuel tank (not shown) to the engine (e.g., FIG. 5). The fuel pressure relief valve actuation block 85 controls the opening and closing of the fuel pressure relief valve (not shown) which releases excess pressure in order to regulate the pressure of fuel within a fuel rail and/or a fuel line. Finally, the thermostat actuation block 95 receives input from the engine temperature setpoint controller 153, which receives input from the desired engine temperature setpoint 127. The thermostat actuation block 95 controls a thermostat valve (not shown) that regulates the flow of coolant through the engine (e.g., FIG. 5) in order to maintain a desired temperature of the engine (e.g., FIG. 5).

Turning to FIG. 5, FIG. 5 shows a schematic diagram of an engine 155. Air enters the engine 155 by way of an intake 199. Intake air passes through an air filter 197 and a mass airflow (MAF) sensor 55 in order to measure the air entering the engine 155. The engine 155 may recirculate exhaust gases from the combustion process with the intake air in order to reduce the amount of combustible air in the combustion process. This has the effect of enrichening the mixture on a lean engine and reducing nitrogen oxides emissions. The intake air then passes by a node 193 where a canister purge line (not shown) connects in order for cannister purge gases to enter and mix with fresh intake air flow to eventually be combusted in the engine 155.

After cannister purge gases enter from the node 193 and mix with the intake air, the intake air then passes through a compressor 191 which compresses the intake air in order to allow for a more efficient combustion process. The compressor 191 is driven by a turbine 173 which is discussed further below. The intake air then passes through both of a hot charge air cooler (CAC) 187 and a cold CAC 189 simultaneously. The hot CAC 187 receives coolant from the engine 155 at a temperature of 90 degrees Celsius, and the cold CAC 189 receives coolant from a radiator (not shown) at a temperature of 40 degrees Celsius. As the intake air passes through the hot CAC 187 and the cold CAC 189, the intake air approaches the temperature of the respective coolant associated with the two CACs. The intake air then passes through an intake air temperature blend valve 185 that combines the intake air from the hot CAC 187 and the cold CAC 189 in order to reach a desired intake air temperature. The temperature of the intake air in the engine 155 is a critical component to controlling the "promotion" of combustion processes in the engine 155. Heated air requires less energy than cold air in the combustion process when introduced with a fuel source, and thus the temperature of the air is important. Air that is too high of a temperature may lead to increased noise and/or emissions, while air that is too cold can cause low torque and/or misfiring in the engine 155. Thus, the intake air temperature blend valve 185 blends the intake air from the hot CAC 187 and the cold CAC 189 such that the intake air reaches a desired temperature for emissions and fuel efficiency according to a load point as defined by an operator.

The temperature-controlled intake air travels from the intake air temperature blend valve 185 to an intake air heater (IAH) 175 for further heating of the air before entering the combustion chamber (not shown) of the engine 155. The combustion chamber (not shown) comprises a first cylinder 177, a second cylinder 179, a third cylinder 181, and a fourth cylinder 183. The cylinders 177-183 facilitate the controlled burning of an air-fuel mixture, converting energy from combustion into mechanical energy that provides power to the vehicle 13. Each cylinder 177-183 comprises a piston (not shown), and each piston (not shown) may perform four strokes (i.e., intake, compression, combustion, and exhaust) which comprise the combustion process. Alternative configurations of the engine 155 may comprise more or less cylinders, such as, but not limited to, a 3-cylinder engine, a V6 engine (i.e., 6 cylinders), a V8 engine (i.e., 8 cylinders), or a V12 engine (i.e., 12 cylinders).

After passing through the cylinders 177-183, the intake air is now considered as exhaust gases because the air-fuel mixture that was used in the combustion process has combusted and is exhausted through the engine 155 in order to perform the combustion process on fresh air-fuel mixture. The exhaust gases first enter a turbine 173. The turbine is part of a turbocharger system which uses the energy from the exhaust gases to spin the turbine 173 and is controlled via the VGT (not shown). The spinning motion of the turbine 173 is used to drive the compressor 191 that was previously mentioned in relation to the intake portion of the engine 155. The exhaust gases then enter a gasoline oxidation catalyst (GOC) 171 and a gasoline particulate filter (GPF) 169. The GOC 171 oxidizes hydrocarbon gases and carbon monoxide emitted from the engine. The GPF 169 captures and traps fine particulates produced during the combustion of fuel.

The exhaust gases then pass through an evaporator 167, which is used to vaporize and mix liquid urea (DEF) sprayed onto evaporator plates. After the evaporator 167, the exhaust gases pass through a first selective catalytic reduction (SCR) unit 161. The first SCR unit 161 facilitates the reduction of nitrogen oxides emissions, typically by way of a reducing agent (i.e., a urea-based diesel exhaust fluid (DEF)) which breaks down nitrogen oxides present in the exhaust gases into nitrogen and water vapor. After the first SCR unit 161, the exhaust gases pass through a back pressure valve (BPV) 163 and into a second SCR unit 165. The BPV 163 ensures the exhaust gases flow in the desired direction, and creates enough pressure for the exhaust gases to flow through the EGR valve 201. The second SCR unit 165 performs the same functions as the first SCR unit 161, further reducing nitrogen oxides emissions from the exhaust gases.

Finally, the exhaust gases pass through a muffler 159 and exit through the exhaust tailpipe 157. The muffler 159 serves to reduce the noise generated by the expulsion of the exhaust gases from the engine 155. The specifications of the muffler 159 may vary depending on state laws and the operator's discretion. Additionally, between the BPV 163 and the evaporator canister 193 are an exhaust gas recirculation (EGR) cooler 203 and an EGR valve 201. The EGR cooler 203 takes in the exhaust gases and cools the exhaust gases down so that the exhaust gases can be recirculated with fresh intake air for the combustion process. Recirculating the exhaust gases reduces nitrogen oxides emissions and assists in controlling the temperature of the air used in the combustion process. The EGR valve 201 regulates the flow of exhaust gases from the EGR cooler 203 to be recirculated in the intake portion of the engine 155.

The engine 155 shown in FIG. 5 is one of several possible configurations for an engine 155. The currently described engine 155 is a gasoline compression ignition (GCI) engine, where the air-fuel mixture is ignited through compression. Alternative engines 155 may include a spark ignition engine, where the air-fuel mixture is ignited by a spark from a spark plug. Further, alternative engines 155 may use different fuels such as diesel instead of gasoline. The currently described engine 155 typically has a response time between 300 to 600 milliseconds, but may have a response time of up to 1200 milliseconds. A typical actuator has a response time of less than 75 milliseconds. Therefore, the system response is relatively slower than the response time of the actuators. Further improvements can be made to the engine 155 such that a faster response time is achieved through methods commonly known in the art.

Turning to FIG. 6, FIG. 6 shows a schematic diagram of an oil gallery 205 used for the engine 155. The oil gallery 205 comprises an oil control valve (OCV) 211, a plurality of lash adjusters 213, vents 209, a lash adjuster oil pressure sensor 221, and a tri-roller Roller Finger Follower (RFF) 220. In addition, an exhaust camshaft 215, exhaust cams 217, and exhaust valves 219 are shown in FIG. 6 because the tri-roller RFF 220, in tandem with the plurality of lash adjusters 213, interacts with the exhaust cams 217 to actuate the exhaust valves 219 of the engine 155.

The main oil gallery pump (not shown) supplies oil to the major working parts of the engine 155 including the oil gallery 205. The oil from the main oil gallery pump (not shown) enters the oil gallery 205 through the oil inlet line 207. The oil is regulated by an oil control valve (OCV) 211 which is configured to dynamically regulate the oil flow and pressure in accordance with the operational demands of the engine 155. The OCV 211 is a solenoid driven valve that regulates the flow of oil from an oil inlet line 207 to the plurality of lash adjusters 213 of the oil gallery 205. Measurements of the oil pressure within the oil gallery 205 are captured by the lash adjuster oil pressure sensor 221, which is disposed at an opposite end of the oil gallery 205 from the OCV 211.

The lash adjuster oil pressure sensor 221 and the OCV 211 each include a vent 209 that releases excess pressure in order to assist in controlling oil flow and pressure through the oil gallery 205. From the OCV 211, oil is supplied to the plurality of lash adjusters 213. The plurality of lash adjusters 213 are disposed in pairs, such that each cylinder 177-183 of the engine 155 corresponds to a pair of lash adjusters 213. Functionally, the plurality of lash adjusters 213 are embodied as fluid outlets that serve to deliver oil from the oil gallery 205 to a corresponding tri-roller RFF 220 in order to facilitate a transition between operating modes of the engine 155. The tri-roller RFF 220, when actuated by the plurality of lash adjusters 213, contacts an exhaust cam 217 of the exhaust camshaft 215.

The exhaust camshaft 215 is configured to control the opening and the closing of the exhaust valves 219 of the engine 155. As the exhaust camshaft 215 rotates, exhaust cams 217 actuate the exhaust valves 219, causing the exhaust valves 219 to open and/or close depending on the rotational position of the exhaust cams 217. The exhaust valves 219 regulate the flow of exhaust gases within the engine cylinders 177-183. Further, with respect to a rebreathe engine, the exhaust camshaft 215 may comprise different cam profiles based on the operational mode in use, such as a normal mode or a rebreathe mode.

For example, the exhaust camshaft 215 features multiple sets of exhaust cams 217, each designed with different profiles to optimize engine performance under varying conditions. Each exhaust cam 217 includes an inner lobe and two outer lobes, where either the inner lobe or the outer lobes contact the tri-roller RFF 220 depending on the operating mode of the engine 155. During normal engine operation, the tri-roller RFF 220 may engage with the outer lobes of the exhaust cams 217, which are optimized for standard performance characteristics such as power output and fuel efficiency. The outer lobes of the exhaust cams 217 determine the valve timing and lift parameters required for typical driving scenarios. However, during low-load conditions such as during highway driving, cold weather conditions, and/or confirmed extended periods of engine idling, the engine 155 may transition into a rebreathe mode. The tri-roller RFF 220 may switch to engage with the inner lobe of the exhaust cams 217, which is specifically designed to open the exhaust valve 219 during an intake stroke of the combustion process of the engine 155. Opening the exhaust valves 219 during the intake stroke promotes auto-ignition of the air-fuel mixture which improves combustion, reduces hydrocarbons, and increases exhaust gases aftertreatment temperatures.

The ECU 23 determines the mode the engine 155 operates in based on input from a user and engine operating load conditions, and each mode is associated with a different array of Engine Setpoint Quantities (ESQ). Further, the ECU 23 is configured to prevent toggling of the modes by way of hysteresis. Hysteresis in this context is defined as a delay and/or lag introduced on purpose in order to ensure toggling between modes does not occur excessively in response to random noise or minor fluctuations in a received signal.

The transition between the inner lobe and outer lobes of the exhaust cams 217 is determined by the electronic control unit (ECU) 23 based on input from a user and engine operating load conditions. The ECU 23 may send signals to the OCV 211 to change the oil pressure provided to the plurality of lash adjusters 213 in order to actuate the tri-roller RFFs 220 to switch cam profiles according to the desired mode. Alternatively, the inner lobe of the exhaust cams 217 may be associated with a rebreathe mode, and the outer lobes of the exhaust cams 217 may be associated with a normal exhaust mode.

Turning to FIG. 7, FIG. 7 shows a plot describing the behavior of the lash adjuster oil pressure oil pressure 222 of the plurality of lash adjusters 213 in response to an oil control valve (OCV) duty cycle. The main oil gallery oil pressure 224 is also provided as a nearly constant reference pressure. The OCV 211 is a pulse width modulated (PWM) solenoid driven valve that regulates the flow of oil from an oil inlet line 207 to the oil gallery 205. The oil inlet line 207 receives oil from a main oil gallery pump (not shown) that supplies oil to the major working parts of the engine 155. When the OCV duty cycle is "off," the OCV 211 operates with a reduced, or zero, oil flow, and when the OCV duty cycle is "on," the OCV 211 operates with an increased, or maximum, oil flow. The OCV 211 controls the lash adjuster oil pressure 222 when rebreathe mode is both on 226 and off 228. When the OCV duty cycle is "off," the rebreathe mode of the engine 155 is turned "on" 226. Rebreathe mode "on" 226 can be seen in FIG. 7 at approximately the 9 second mark. When the OCV duty cycle is "on," the rebreathe mode of the engine 155 is turned "off" 228 and operates in a normal mode. Rebreathe mode "off" 228 can be seen in FIG. 7 at approximately the 17.5 second mark. Further, the lash adjuster oil pressure sensor 221 measures the lash adjuster oil pressure 222.

When the OCV duty cycle is "off" and the rebreathe mode is "on" 226, the reduced oil flow due to the OCV 211 causes the lash adjuster oil pressure 222 to drop. As noted above, the plurality of lash adjusters 213 are embodied as fluid outlets that serve to deliver oil from the oil gallery 205 to a corresponding tri-roller RFF 220. Each RFF of the plurality of RFFs 220 may comprise a lock pin and a spring that is actuated by either a reduced oil pressure and/or an increased oil pressure based on the OCV duty cycle. With respect to FIG. 7, the lock pin in the RFF 220 is maintained in a withdrawn position while the OCV duty cycle is "on" and the engine 155 operates in a normal mode without rebreathing until approximately the 9 second mark. At the 9 second mark, the OCV duty cycle is turned "off," the lash adjuster oil pressure 222 drops, and the engine 155 begins operating in rebreathe mode. While rebreathe mode is "on," the lock pin is in an extended position and the center cam 217 and RFF 220 produce rebreathe valve motion.

The main oil gallery pump (not shown) supplies oil to the major working parts of the engine 155. Because the main oil gallery pump is not limited to supplying oil to only the oil gallery 205, the main oil gallery oil pressure 224 remains nearly constant and is unaffected by the OCV duty cycle.

Figure 8:
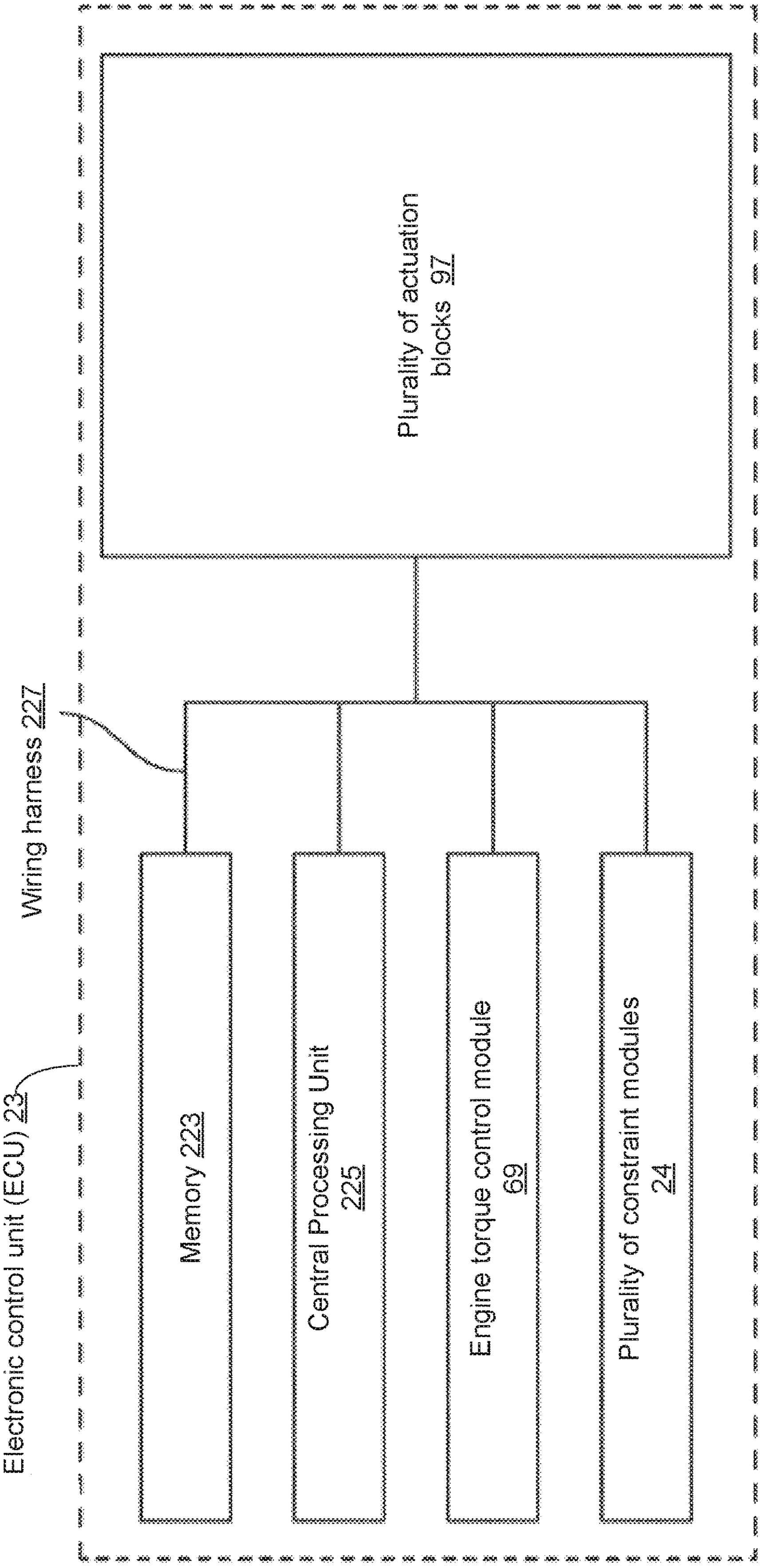
FIG. 8 depicts a flowchart of a system in accordance with one or more embodiments disclosed herein.

Turning to FIG. 8, FIG. 8 depicts a block diagram of various components forming the Electronic Control Unit (ECU) 23. The ECU 23 operates to determine a plurality of actuator setpoints for the plurality of actuators. Thus, FIG. 8 depicts components that provide information or receive instructions from the ECU 23 in order to enable a combustion reaction in the engine 155 facilitated through the plurality of actuators. In this regard, components depicted in FIG. 8 as being inside the ECU 23 represent a memory 223, a central processing unit (CPU) 225, an engine torque control module 69, a plurality of constraint modules 24, and a plurality of actuation blocks 97. The various components of FIG. 8 are connected by way of a wiring harness 227, which is a bundle of wires that form electrical pathways between the components of the ECU 23.

The CPU 225 of the ECU 23 is formed by one or more processors, integrated circuits, microprocessors, or equivalent computing structures that serve to execute computer readable instructions stored on the memory 223. The memory 223 of the ECU 23 includes a non-transitory storage medium such as flash memory, a Hard Disk Drive (HDD), a solid state drive (SSD), a combination thereof, or equivalent storage devices. In relation to the invention as described herein, the memory 223 stores computer readable instructions, executed by the CPU 225, that relate to controlling the plurality of actuators to facilitate a combustion reaction in the engine 155.

As previously discussed, the plurality of constraint modules 24 are configured to determine a horizon request 65 for an engine 155 based on input from a user. The engine torque control module 69 receives the horizon request 65 from the plurality of constraint modules 24 in order to provide the plurality of actuators with a plurality of actuator setpoints converted into a plurality of voltage signals by the plurality of actuation blocks 97.

Figure 9:
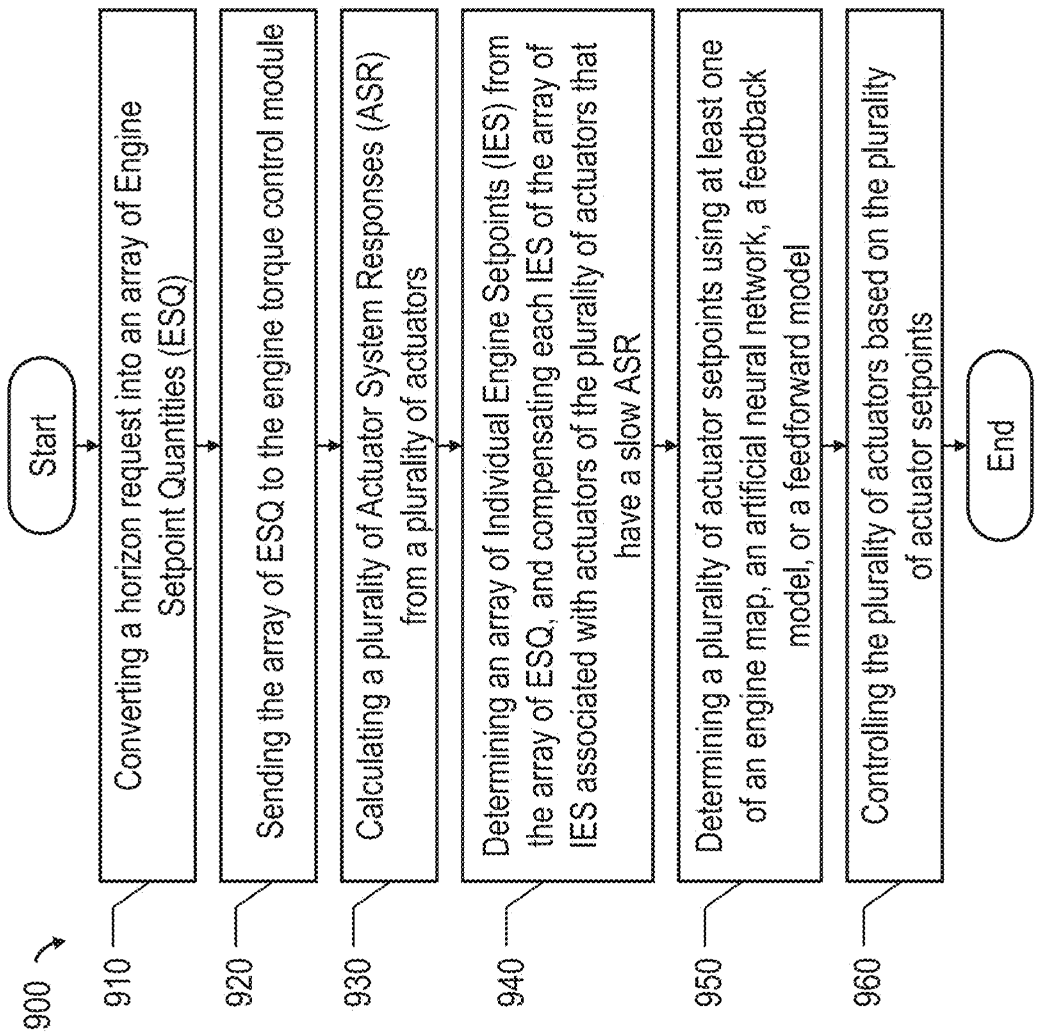
FIG. 9 depicts a flowchart of a process for controlling actuators of a system in accordance with one or more embodiments disclosed herein.

Turning to FIG. 9, FIG. 9 depicts a method 900 for controlling the plurality of actuators based on horizon requests 65 in accordance with one or more embodiments of the invention. While the various blocks in FIG. 9 are presented and described sequentially, one of ordinary skill in the art will appreciate that some or all of the blocks may be executed in a different order, may be combined or omitted, and some or all of the blocks may be executed in parallel and/or iteratively. The blocks may encompass multiple actions and/or multiple blocks may be performed in the same physical action. Furthermore, the blocks may be performed actively or passively.

The method of FIG. 9 initiates at Step 910, which includes converting a horizon request 65 into an array of Engine Setpoint Quantities (ESQ). The horizon request 65 from a reserve and load adjustment module 63 of the plurality of constraint modules 24 is sent to a brake to ESQ module 99. The brake to ESQ module 99 converts the horizon request 65 containing units of brake torque into an array of ESQ containing units of the desired ESQ, where the ESQ is typically an Indicated Mean Effective Pressure (IMEP) or a Net Mean Effective Pressure (NMEP) or a Brake Mean Effective Pressure (BMEP).

As is commonly known in the art, the IMEP of the engine 155 is derived, in part, from the torque produced by the crankshaft (not shown) of the engine 155 and the collective displacement volume of the cylinders 177-183. The IMEP reflects the generalized capacity of the engine 155 to output work, which is related to the internal pressure acting upon the pistons (not shown).

Step 920 includes sending the array of ESQ to an engine torque control module 69 from the brake to ESQ module 99 of the plurality of constraint modules 24. The engine torque control module 69 comprises an engine setpoint optimizer module 101 and an engine setpoint control module 103. The array of ESQ, converted from a horizon request 65, comprises an array of anticipated future values derived from a user's current driving actions and/or information related to an external environment of the system.

Step 930 includes calculating, with the engine setpoint optimizer module 101, a plurality of time delays associated with the plurality of actuators. Specifically, each time delay corresponds to the time elapsed between sending an individual actuator of the plurality of actuators a command and receiving a system response from the individual actuator of the plurality of actuators. The engine setpoint optimizer module 101 stores the plurality of time delays as a plurality of actuator system responses (ASR).

In Step 940, the engine setpoint optimizer module 101 determines an array of individual engine setpoints (IES) from the array of ESQ based on the plurality of ASR. The array of IES is represented in terms of timing, split percentage, pressure, flow, temperature, and mass, and corresponds to the desired value that the associated components the engine 155 are expected to achieve. The array of IES may be determined using an engine map, and/or an artificial neural network, and/or a feedback model, and/or a feedforward model.

Further, Step 940 includes compensating each IES of the array of IES that are associated with actuators of the plurality of actuators that have a slow ASR. Each actuator of the plurality of actuators may have a different ASR time, where one actuator may have an ASR of less than 20 milliseconds, while another actuator may have an ASR of approximately 100 milliseconds. The engine setpoint control module 103 is configured to coordinate the timing of each IES of the array of IES based on the plurality of ASR of the plurality of actuators in order to optimize performance of the engine 155. In this way, for example, an actuator with an ASR of 100 milliseconds may receive a signal for actuation 80 milliseconds before an actuator with an ASR of 20 milliseconds receives a signal for actuation in order for the system response of both actuators to occur at the same point in time. Alternatively, an actuator of the plurality of actuators with a fast ASR may be purposely delayed in order to coordinate timing with an actuator of the plurality of actuators with a slower ASR.

Step 950 includes determining a plurality of actuator setpoints, based on the array of IES and the plurality of ASR, using at least one of: an engine map, and/or an artificial neural network, and/or a feedback model, and/or a feedforward model. The plurality of actuator setpoints differ from the array of IES because the actuator setpoints correspond to the timing of the various components of the engine 155 performing their respective function, while the array of IES corresponds to desired values to be achieved from the various components of the engine 155 performing their respective functions. For example, the desired intake air temperature setpoint 115 (i.e., an IES) specifies the desired temperature to be achieved by the intake air before entering the cylinders 177-183, while the intake air temperature blend valve actuation block 83 signals when to open and close the intake air temperature blend valve 185 (i.e., an actuator) so that the desired intake air temperature setpoint 115 may be achieved.

An engine map is preferred when it is more than 85% accurate and a model can fit into 2-dimensional tables. Engine maps may be typically used for determining the setpoints of the tri-roller RFF 220, associated with the rebreathe actuation block 73, and the VIC (not shown), associated with the VIC position control actuation block 75. An artificial neural network, or 3D (or higher dimensional) data driven model, is preferred when the relationship between input and output requires more than two dimensions, such as for the VGT (not shown), associated with the VGT actuation block 77. At least one of a feedback model and/or a feedforward model are preferred when measured and predicted information is used, respectively, to compensate for the plurality of ASR associated with the plurality of actuators in order to control the operation of the engine (e.g., FIG. 5) as desired with greater than 85% accuracy.

Feedforward models are predictive models that anticipate the effects of certain inputs on the output of a system without relying on feedback from the output. On the other hand, feedback models rely on information returned from the output of the system and adjust inputs accordingly. The current invention may comprise at least one of a feedforward model and/or a feedback model, and both a feedforward model and a feedback model may be used in tandem to determine the plurality of actuator setpoints. The feedforward model, due to the nature of predicting future behavior of the system, may require prerequisite information regarding the desired performance of the system, as well as previously known and/or theoretical effects that certain inputs are expected to incur from the system.

Finally, Step 960 includes controlling the plurality of actuators based on the plurality of actuator setpoints. The plurality of actuator setpoints, determined by the engine setpoint control module 103, are converted to a plurality of voltage signals by the plurality of actuation blocks 97. The plurality of actuation blocks 97 provide the plurality of voltage signals to each actuator of the plurality of actuators in order to achieve optimal engine performance. The plurality of actuation blocks 97 may comprise, for instance, a fuel SOI actuation block 89, a fuel split actuation block 91, a fuel mass actuation block 87, and a fuel pump actuation block 92. The plurality of actuator setpoints corresponding with the aforementioned plurality of actuation blocks 97 are coordinated such that fuel may be delivered to the cylinders 177-183 of the engine 155 to maximize fuel efficiency during combustion. For example, the fuel pump (not shown), associated with the fuel pump actuation block 92, regulates the flow of fuel from the fuel tank to the engine 155, and the fuel injectors (not shown), associated with the fuel split actuation block 91, controls the percentage of fuel split between two injections with each fuel injector (not shown). With further respect to the fuel split actuation block 91, a fuel split of 60% means that 60% of the fuel for a fuel injector goes into the first of two injections into a cylinder of the plurality of cylinders 177-183 and the remaining 40% is injected in the second of the two injections in a cylinder of the plurality of cylinders 177-183. The fuel split process occurs the same way for each of the cylinders 177-183.

Continuing with the actuation blocks 97 associated with delivering fuel to the cylinders 177-183, the fuel SOI actuation block 89, associated with the fuel injectors (not shown), controls the timing of when fuel is initially injected into the cylinders 177-183, and the fuel rail control valve (not shown), associated with the fuel mass actuation block 87, controls the total amount of fuel available for injection. The plurality of actuation blocks, which convert the plurality of actuator setpoints into a plurality of voltage signals, control the timing and duration for which each of the plurality of actuators is actuated in order to achieve the desired array of IES while ensuring the user experiences a smooth driving experience. Further, the plurality of actuator setpoints, and thus the plurality of actuation blocks 97, aim to achieve maximum engine performance and efficiency while minimizing emissions.

Figure 10:
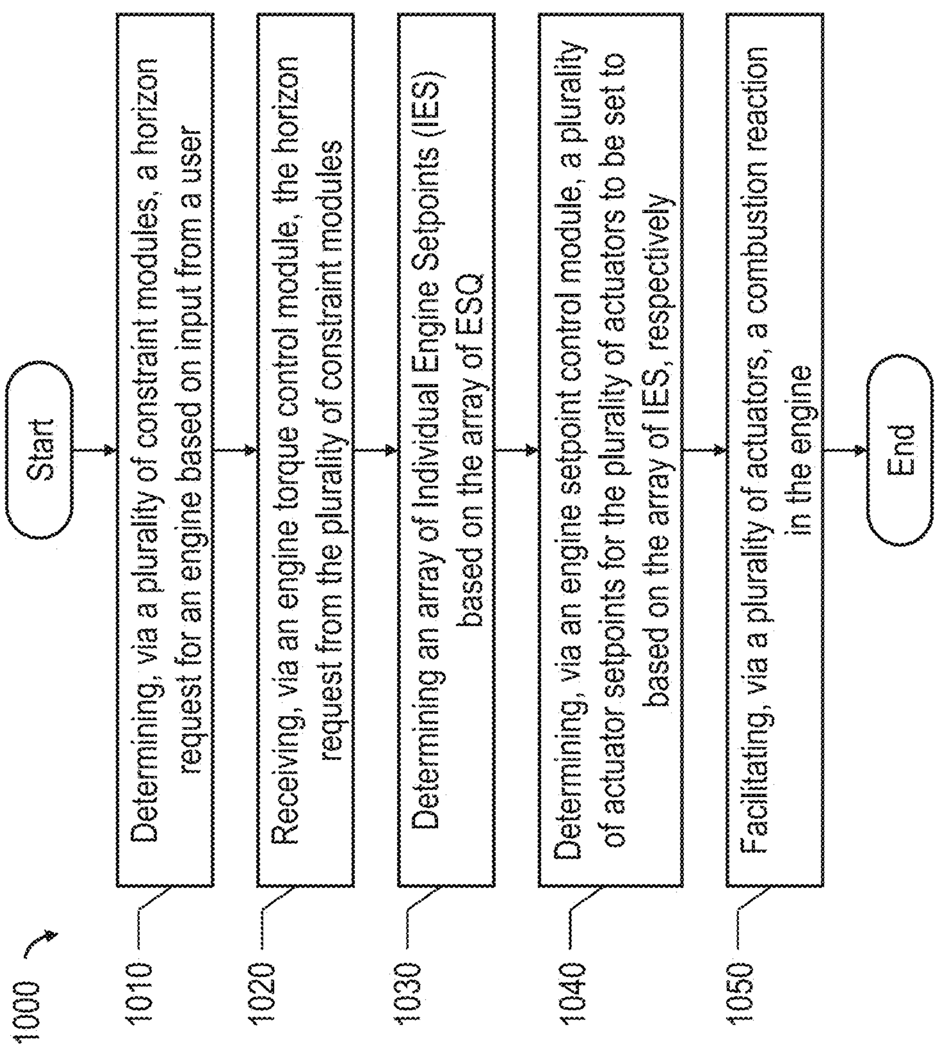
FIG. 10 depicts a flowchart of a process for coordinating a plurality of actuators to control a response of a vehicle in order to enable a desired engine response of the vehicle in accordance with one or more embodiments disclosed herein.

Turning to FIG. 10, FIG. 10 depicts a method 1000 for coordinating a plurality of actuators to control a response of a vehicle 13 as a whole in order to enable a desired engine torque response of the vehicle 13 in accordance with one or more embodiments of the invention. While the various blocks in FIG. 10 are presented and described sequentially, one of ordinary skill in the art will appreciate that some or all of the blocks may be executed in a different order, may be combined or omitted, and some or all of the blocks may be executed in parallel and/or iteratively. The blocks may encompass multiple actions and/or multiple blocks may be performed in the same physical action. Furthermore, the blocks may be performed actively or passively.

The method of FIG. 10 initiates at Step 1010, which includes determining, via a plurality of constraint modules 24, a horizon request 65 for an engine 155 based on input from a user. The plurality of constraint modules 24 predict the torque required over a predetermined period of time in the future based on input from a user. The horizon request 65 comprises an array of anticipated future values derived from a user's current driving actions or information related to an external environment of the system. Input from the user may, for example, include engagement of the accelerator pedal or brake pedal, interpreted by the pedal interpretation module 29, and/or whether or not the vehicle 13 is maintaining a constant speed, interpreted by the cruise module 27, and/or the use of auxiliary power-consuming components of the vehicle 13 such as an air conditioning system, interpreted by the reserve and load adjustment module 63. The horizon request 65 is shaped by the plurality of constraint modules 24 such that the user may experience a smooth transition from a current velocity to a future velocity.

In Step 1020, the engine torque control module 69 receives the horizon request 65 from the plurality of constraint modules 24. Specifically, a horizon request 65 from the reserve and load adjustment module 63 of the plurality of constraint modules 24 is converted from units of brake torque to a horizon request 65 comprising an array of Engine Setpoint Quantities (ESQ) by a brake to ESQ module 99 of the plurality of constraint modules 24. The engine torque control module 69 then receives the horizon request 65 with units of ESQ. ESQ is typically represented as an Indicated Mean Effective Pressure (IMEP) or a Net Mean Effective Pressure (NMEP) or a Brake Mean Effective Pressure (BMEP). As is commonly known in the art, the IMEP of the engine 155 is derived, in part, from the torque produced by the crankshaft (not shown) of the engine 155 and the collective displacement volume of the cylinders 177-183. The IMEP reflects the generalized capacity of the engine 155 to output work, which is related to the internal pressure acting upon the pistons (not shown).

Step 1030 includes determining, via an engine setpoint optimizer module 101, an array of Individual Engine Setpoints (IES) based on the array of ESQ. The array of IES is expressed in terms of timing, split percentage, pressure, flow, temperature, and mass. Further, the array of IES may be determined using at least one of: an engine map, and/or an artificial neural network, and/or a feedback model, and/or a feedforward model. Additionally, the engine setpoint optimizer module 101 is further configured to calculate a plurality of time delays, where each time delay corresponds to the time elapsed between sending an individual actuator of the plurality of actuators a command and receiving a system response from the individual actuator of the plurality of actuators. The plurality of times delays are stored in the engine setpoint optimizer module 101 as a plurality of actuator system responses (ASR). The array of ASR may be used in the determination of the array of IES in order to compensate each IES of the array of IES that are associated with actuators of the plurality of actuators that have a slow ASR.

Step 1040 includes determining, via an engine setpoint control module 103, actuator setpoints for the plurality of actuators to be set to based on the array of IES, respectively. The plurality of ASR are used to coordinate the timing of the plurality of actuators in order to achieve the desired array of IES and provide a comfortable driving experience for a user. Actuator setpoints comprise target values for the timing or adjustments of the actuators in order to achieve a smooth driving experience for a user. The engine setpoint control module 103 receives input from the engine setpoint optimizer module 101 and the engine setpoint control module 103 translates the IES to setpoints of the actuators. The plurality of actuator setpoints differ from the array of IES because the actuator setpoints correspond to the timing of the various components of the engine 155 performing their respective function, while the array of IES corresponds to desired values to be achieved from the various components of the engine 155 performing their respective functions.

Step 1050 includes facilitating, via a plurality of actuators, a combustion reaction in the engine 155. The combustion takes place in the cylinders 177-183 where a fuel-air mixture may be spark ignited or compressed in order to combust. The plurality of actuator setpoints are converted, via the plurality of actuation blocks 97, into a plurality of corresponding voltage signals. Each actuator of the plurality of actuators receives a corresponding voltage signal of the plurality of voltage signals, and each actuator is operated based upon the corresponding voltage signal in order to collectively facilitate a combustion reaction in the engine. The plurality of actuation blocks 97 send voltage signals to the plurality of actuators of the engine 155 in order to achieve a smooth driving experience for a user.

Although only a few example embodiments have been described in detail above, those skilled in the art will readily appreciate that many modifications are possible in the example embodiments without materially departing from this invention. In addition, many modifications will be appreciated by those skilled in the art to adapt a particular component, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising"

is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A system, comprising:

an electronic control unit (ECU) comprising:

a plurality of constraint modules configured to determine a horizon request for an engine of a vehicle based on input from a user of the vehicle, wherein the horizon request comprises an array of anticipated future torque values predicted over a future time horizon based on current driving actions of the user and information related to an external driving environment of the vehicle, said array of anticipated future torque values arranged such that, when applied to the engine, the user of the vehicle experiences a smooth transition from a current velocity to a future velocity, wherein the plurality of constraint modules comprises a brake to engine setpoint quantities (ESQ) module configured to convert the horizon request into an array of ESQ;

an engine torque control module configured to receive as input the horizon request from the plurality of constraint modules, the engine torque control module comprising:

an engine setpoint optimizer module configured to receive the horizon request as the array of ESQ, and determine an array of Individual Engine Setpoints (IES) based on the array of ESQ, wherein each setpoint in the array of IES is expressed in terms of timing, split percentage, pressure, flow, temperature, or mass;

an engine setpoint control module configured to determine a plurality of actuator setpoints based on the array of IES, and a plurality of actuation blocks configured to convert the plurality of actuator setpoints into a plurality of voltage signals, and a plurality of actuators, each actuator being configured to receive a corresponding voltage signal of the plurality of voltage signals and operate based upon the corresponding voltage signal to collectively facilitate a combustion reaction in the engine.

2. The system of claim 1, wherein the ESQ comprises an Indicated Mean Effective Pressure (IMEP) or a Net Mean Effective Pressure (NMEP) or a Brake Mean Effective Pressure (BMEP).

3. The system of claim 1, wherein the engine setpoint optimizer module is further configured to calculate a plurality of time delays, wherein each time delay corresponds to time elapsed between sending an individual actuator of the plurality of actuators a command and receiving a system response from the individual actuator of the plurality of actuators.

4. The system of claim 3, wherein the engine setpoint optimizer module is further configured to store the plurality of time delays as a plurality of Actuator System Responses (ASR) of the plurality of actuators.

5. The system of claim 4, wherein the array of IES is determined based upon the array of ESQ and the plurality of ASR of the plurality of actuators.

6. The system of claim 5, wherein the engine setpoint control module is further configured to coordinate a timing of the array of IES based on the plurality of ASR of the plurality of actuators.

7. The system of claim 1, wherein the ECU determines, based on load conditions, an engine mode in which the engine operates, wherein the engine mode is selected from the group consisting of a rebreathe mode and a normal mode, and wherein the rebreathe mode and the normal mode are associated with a different set of setpoints in the array of ESQ.

8. The system of claim 7, wherein the ECU is configured to implement hysteresis to prevent toggling of the engine mode.

9. The system of claim 1, wherein the engine setpoint control module comprises at least one feedforward model and at least one feedback model.

10. The system of claim 1, wherein the plurality of actuator setpoints may be are determined using an engine map, an artificial neural network, a feedback model, or a feedforward model.

11. The system of claim 1, wherein the plurality of actuators comprises an intake air temperature blend valve, a variable geometry turbo (VGT), a thermostat valve, an oil control valve (OCV), and an intake air heater (IAH).

12. A method comprising:

determining, via a plurality of constraint modules, a horizon request for an of a vehicle based on input from a user of the vehicle, wherein the horizon request comprises an array of anticipated future torque values predicted over a future time horizon based on current driving actions of the user and information related to an external driving environment of the vehicle, said array of anticipated future torque values arranged such that, when applied to the engine, the user of the vehicle experiences a smooth transition from a current velocity to a future velocity, wherein the plurality of constraint modules comprises a brake to engine setpoint quantities (ESQ) module configured to convert the horizon request into an array of ESQ;

receiving, via an engine torque control module, the horizon request from the plurality of constraint modules, the engine torque control module configured to perform the steps of:

receiving, via an engine setpoint optimizer module, the horizon request as the array of ESQ, and determining an array of Individual Engine Setpoints (IES) based on the array of ESQ, wherein each setpoint in the array of IES is expressed in terms of timing, split percentage, pressure, flow, temperature, or mass;

determining, via an engine setpoint control module, a plurality of actuator setpoints based on the array of IES, and converting, via a plurality of actuation blocks, the plurality of actuator setpoints into a plurality of voltage signals, and facilitating, via a plurality of actuators, a combustion reaction in the engine, each actuator of the plurality of actuators receiving a corresponding voltage signal of the plurality of voltage signals and operating based upon the corresponding voltage signal.

13. The method of claim 12, further comprising: calculating, via the engine setpoint optimizer module, a plurality of time delays, wherein each time delay corresponds to time elapsed between sending an individual actuator of the plurality of actuators a command and receiving a system response from the individual actuator of the plurality of actuators.

14. The method of claim 13, further comprising: storing, via the engine setpoint optimizer module, the plurality of time delays as a plurality of Actuator System Responses (ASR) of the plurality of actuators.

15. The method of claim 14, further comprising: determining the array of IES based upon the array of ESQ and the plurality of ASR of the plurality of actuators.

16. The method of claim 15, further comprising: coordinating, via the engine setpoint control module, a timing of each setpoint of the array of IES based on the plurality of ASR of the plurality of actuators.

17. The method of claim 16, further comprising: determining, via the engine setpoint control module, the plurality of actuator setpoints using the array of IES and the plurality of ASR of the plurality of actuators.

18. The method of claim 17, further comprising: determining the plurality of actuator setpoints by way of an engine map, an artificial neural network, a feedback model, or a feedforward model.

19. The method of claim 12, further comprising: determining, via an electronic control unit (ECU) and based on load conditions, an engine mode in which the engine operates, wherein the engine mode is selected from the group consisting of a rebreathe mode and a normal mode, and wherein the rebreathe mode and the normal mode are associated with a different set of setpoints in the array of ESQ.

20. The method of claim 19, further comprising: performing hysteresis, via the ECU, to prevent toggling of the engine mode.

* * * * *